US009425672B2

(12) United States Patent
Sahara et al.

(10) Patent No.: US 9,425,672 B2
(45) Date of Patent: Aug. 23, 2016

(54) MOTOR AND BRUSHLESS MOTOR

(71) Applicant: ASMO CO., LTD., Kosai, Shizuoka-pref. (JP)

(72) Inventors: Yoshimichi Sahara, Kosai (JP); Takuro Ota, Kosai (JP); Akio Murase, Kosai (JP); Akihiko Suzuki, Kosai (JP)

(73) Assignee: ASMO CO., LTD., Shizuoka-pref. (JP)

( * ) Notice: Subject to any disclaimer, the term of this patent is extended or adjusted under 35 U.S.C. 154(b) by 751 days.

(21) Appl. No.: 13/748,590

(22) Filed: Jan. 24, 2013

(65) Prior Publication Data

US 2013/0193787 A1    Aug. 1, 2013

(30) Foreign Application Priority Data

Jan. 26, 2012  (JP) ................................. 2012-014469
Jul. 4, 2012   (JP) ................................. 2012-150908

(51) Int. Cl.
*H02K 11/00* (2016.01)
*H02K 9/22*  (2006.01)
*H02K 29/08* (2006.01)

(52) U.S. Cl.
CPC ............. *H02K 11/0021* (2013.01); *H02K 9/22* (2013.01); *H02K 11/33* (2016.01); *H02K 29/08* (2013.01)

(58) Field of Classification Search
CPC  H02K 11/0021; H02K 11/0073; H02K 29/08
USPC ....................................................... 310/68 B
See application file for complete search history.

(56) References Cited

U.S. PATENT DOCUMENTS

| 4,429,263 A | | 1/1984 | Muller | |
| 4,547,714 A | * | 10/1985 | Muller | ................... H02K 29/08 |
| | | | | 310/68 R |
| 4,818,907 A | * | 4/1989 | Shirotori | ............ G11B 19/2009 |
| | | | | 310/67 R |

(Continued)

FOREIGN PATENT DOCUMENTS

| CN | 1930761 A | 3/2007 |
| JP | S54-024073 | 2/1979 |

(Continued)

OTHER PUBLICATIONS

English language translation of the following: Office action dated Mar. 24, 2015 from the Japanese Patent Office in a Japanese patent application corresponding to the instant patent application. This office action translation is submitted now in order to supplement the understanding of the cited references which are being disclosed in the instant Information Disclosure Statement.

(Continued)

*Primary Examiner* — Terrance Kenerly
(74) *Attorney, Agent, or Firm* — Solaris Intellectual Property Group, PLLC

(57) ABSTRACT

A brushless motor is provided that is capable of suppressing water from contacting a magnetism detection sensor. A brushless motor includes a rotor section that includes a rotor magnet; a stator section that generates a rotational magnetic field with respect to the rotor magnet; a magnetism guide member that guides a portion of magnetism from the rotor magnet; a control unit that includes a circuit substrate and a circuit chamber which is sealed and houses the circuit substrate; and a magnetism detection sensor that is mounted on the circuit substrate inside the circuit chamber and that detects magnetism guided by the magnetism guide member.

18 Claims, 31 Drawing Sheets

(56) References Cited

U.S. PATENT DOCUMENTS

| | | | | |
|---|---|---|---|---|
| 5,864,162 | A * | 1/1999 | Reedy | H01L 21/86 257/347 |
| 6,424,061 | B1 * | 7/2002 | Fukuda | H02K 11/0073 310/49.11 |
| 2007/0001528 | A1 | 1/2007 | Umegaki et al. | |
| 2009/0153001 | A1 * | 6/2009 | Horng | H02K 11/0073 310/68 R |
| 2010/0019629 | A1 * | 1/2010 | Amaya | D06F 7/065 310/68 R |

FOREIGN PATENT DOCUMENTS

| | | | |
|---|---|---|---|
| JP | S55-029294 | A | 3/1980 |
| JP | S56-159960 | A | 12/1981 |
| JP | S59-011762 | | 1/1984 |
| JP | H3-198647 | A | 8/1991 |
| JP | H06-315254 | A | 11/1994 |
| JP | H9-98560 | A | 4/1997 |
| JP | H9-117122 | A | 5/1997 |
| JP | H10-191595 | A | 7/1998 |
| JP | 2002-191156 | | 7/2002 |
| JP | 2005-261089 | A | 9/2005 |
| JP | 2010-98887 | A | 4/2010 |
| JP | 2010-200418 | A | 9/2010 |
| WO | 2010/150530 | A1 | 12/2010 |

OTHER PUBLICATIONS

English language translation of the following: Office action dated Jul. 21, 2015 from the Japanese Patent Office in a Japanese patent application corresponding to the instant patent application. This office action translation is submitted now in order to supplement the understanding of the cited references which are being disclosed in the instant Information Disclosure Statement.

English language translation of the following: Office action dated Oct. 20, 2015 from the Japanese Patent Office in a Japanese patent application corresponding to the instant patent application. This office action translation is submitted now in order to supplement the understanding of the cited references which are being disclosed in the instant Information Disclosure Statement.

English language translation of the following: Office action dated Mar. 25, 2016 from the SIPO in a Chinese patent application corresponding to the instant patent application. This office action translation is submitted now in order to supplement the understanding of the cited references which are being disclosed in the instant Information Disclosure Statement.

* cited by examiner

MOTOR AND BRUSHLESS MOTOR

CROSS-REFERENCE TO RELATED APPLICATION

This application claims priority under 35 USC 119 from Japanese Patent Applications No. 2012-014469 filed Jan. 26, 2012 and No. 2012-150908 filed Jul. 4, 2012, the disclosures of which are incorporated by reference herein.

BACKGROUND OF THE INVENTION

1. Field of the Invention

The present invention relates to a motor and a brushless motor.

2. Related Art

Known brushless motor is provided with a magnetic flux guide member (magnetism guide member) that guides a portion of magnetic flux (magnetism) from a rotor magnet towards a magnetic flux detector (magnetism detection sensor) (see for example Japanese Patent Application Laid-Open (JP-A) No. 2010-98887 (hereinafter, Patent Document 1)).

However, there is a concern that the magnetic flux detector may come into contact with water (get wet) when such known brushless motor is for example used in a water contact environment.

Further, a motor is known in which magnetism generated (emanated) from a rotor magnet is detected by a detection element device (magnetism detection sensor), and the rotation position of the rotor is detected. However, there is an issue that magnetism emanating from a stator influences and prevents precise detection of the magnetism emanating from the rotor magnet by the detection element device (whereby the rotation position of the rotor cannot be detected with good precision).

Patent Document 1 discloses a brushless motor in which polarity of a detection section that detects magnetic flux from a rotor magnet is switched when a winding wire (coil) wound around teeth is in a non-conducting state. However, in this brushless motor, it is necessary to dispose the detection portion in a position such as where the polarity of the detection section is switched when the winding wire is in a non-conducting state, and to switch the conduction state of the winding wire so as to place the winding wire in a non-conducting state when the polarity of the detection section is switched.

Moreover, in Patent Document 1, the motor disclosed therein is configured such that a magnetism detection sensor is disposed at a separation from a motor section, and a magnetism guide member is disposed between the motor section and the magnetism detection sensor such that magnetism emanating from a rotor magnet is guided towards the magnetism detection sensor.

However, in a case in which the magnetism detection sensor is disposed at a separation to the motor section, with simply disposing the magnetism guide member between the motor portion and the magnetism detection sensor, the magnetism guided towards the magnetism detection sensor is insufficient, so it is not possible to detect magnetism emanating from the rotor magnet with good precision (it is not possible to detect the rotation position of the rotor with good precision).

SUMMARY OF THE INVENTION

In consideration of the above circumferences, an object of the present invention is to provide a brushless motor capable of suppressing water contact to a magnetic flux detector.

In consideration of the above circumferences, another object of the present invention is to provide a motor capable of detecting magnetism emanating from a rotor magnet with good precision even when current is flowing in a winding wire of a stator.

Another object of the present invention is to provide a motor capable of detecting magnetism emanating from a rotor magnet with good precision even in a case in which a magnetism detection sensor is disposed separated from a motor section.

In order address the above issues, a brushless motor of a first aspect includes: a rotor section that includes a rotor magnet; a stator section that generates a rotational magnetic field with respect to the rotor magnet; a magnetism (magnetic flux) guide member that guides a portion of magnetism (magnetic flux) from the rotor magnet; a control unit that includes a circuit substrate and a circuit chamber which is sealed and houses the circuit substrate; and a magnetism (magnetic flux) detection sensor that is mounted on the circuit substrate inside the circuit chamber and that detects magnetism guided by the magnetism guide member.

According to this brushless motor, the control unit includes the sealed circuit chamber housing the circuit substrate, and the magnetism detection sensor is mounted to the circuit substrate inside the circuit chamber. Water contact to the magnetism detection sensor can accordingly be suppressed even when the brushless motor is used in a water contact environment.

A brushless motor of a second aspect is the brushless motor of the first aspect wherein: an opening portion is formed at a wall portion configuring the circuit chamber; and the magnetism guide member is inserted into the opening portion.

According to this brushless motor, the opening portion is formed at the wall portion configuring (forming) the circuit chamber, and the magnetism guide member is inserted into the opening portion. The magnetism guide member can accordingly be disposed closer to the magnetism detection sensor by the amount by which the magnetism guide member is inserted into the opening portion. The detection precision of magnetism by the magnetism detection sensor can accordingly be enhanced.

A brushless motor of a third aspect is the brushless motor of the second aspect wherein: the control unit includes a heat sink; and the wall portion is formed at the heat sink.

According to this brushless motor, the materials used can be reduced by forming the wall portion that configures the circuit chamber at the heat sink (by using the heat sink as one of the members configuring the circuit chamber). A reduction in size and reduction in cost of the brushless motor can accordingly be achieved.

A brushless motor of a fourth aspect is the brushless motor of the second aspect wherein it further includes a center piece that supports the stator section and the control unit, wherein the wall portion is provided at the center piece.

According to this brushless motor, the materials used can be reduced by using the center piece as one of the members configuring the circuit chamber. A reduction in size and reduction in cost of the brushless motor can accordingly be achieved.

A brushless motor of a fifth aspect is the brushless motor of any one of the second aspect to the fourth aspect wherein the opening portion is a recessed portion.

According to this brushless motor, the magnetism guide member can be disposed closer to the magnetism detection sensor whilst still securing the sealing properties of the circuit chamber by configuring the opening portion as a recessed portion (since the opening portion is closed in a pocket shape rather than a through hole).

A brushless motor of a sixth aspect is the brushless motor of the second aspect wherein: the opening portion is a recessed portion; the control unit includes a heat sink and a resin member integrally formed to the heat sink; and the wall portion is formed at the resin member.

According to this brushless motor, the detection precision of magnetism by the magnetism detection sensor can be secured by forming the recessed portion at a resin material through which magnetism can readily pass (that does not readily diffuse magnetism).

A brushless motor of a seventh aspect is the brushless motor of any one of the second aspect to the fourth aspect wherein: the opening portion is a through hole; and a leading end portion of the magnetism guide member faces and is close to a mounting location of the magnetism detection sensor at the circuit substrate, or faces and is close to the magnetism detection sensor.

According to this brushless motor, the opening portion is configured as a through hole, and the leading end portion of the magnetism guide member inserted into the through hole is in close to and faces the mounting location of the magnetism detection sensor at the circuit substrate, or is in close to and faces the magnetism detection sensor. The detection precision of magnetism by the magnetism detection sensor can accordingly be further enhanced by disposing the magnetism guide member closer to the magnetism detection sensor.

A brushless motor of an eighth aspect is the brushless motor of the seventh aspect wherein a seal member is provided between the magnetism guide member and a peripheral portion of the through hole.

According to this brushless motor, the sealing properties of the circuit chamber can be secured due to providing the seal member between the magnetism guide member and the peripheral portion of the through hole.

A brushless motor of a ninth aspect is the brushless motor of the seventh aspect or the eighth aspect wherein: the magnetism detection sensor is mounted on a surface of the circuit substrate which is at a side of the magnetism guide member; and a leading end portion of the magnetism guide member faces and is close to the magnetism detection sensor.

According to this brushless motor, the magnetism detection sensor is mounted on the surface of the circuit substrate which is at the magnetism guide member side, such that the leading end portion of the magnetism guide member is in close to and faces the magnetism detection sensor. The detection precision of magnetism by the magnetism detection sensor can accordingly be enhanced due to the leading end portion of the magnetism guide member and the magnetism detection sensor facing each other directly.

A brushless motor of a tenth aspect is the brushless motor of the seventh aspect to the ninth aspect wherein the leading end portion of the magnetism guide member projects out further towards a side of the magnetism detection sensor than the through hole.

According to this brushless motor, the leading end portion of the magnetism guide member projects out further towards the magnetism detection sensor side than the through hole. The detection precision of magnetism by the magnetism detection sensor can accordingly be enhanced since the leading end portion of the magnetism guide member can be disposed even closer to the magnetism detection sensor.

A brushless motor of an eleventh aspect is the brushless motor of any one of the second aspect to the tenth aspect wherein the magnetism guide member is press-fitted into the opening portion.

According to this brushless motor, the magnetism guide member can be easily fixed to the control unit by press-fitting the magnetism guide member into the opening portion.

Moreover, in a case in which the opening portion is configured by a through hole, the sealing properties of the circuit chamber can be secured by press-fitting a projection (convex) portion into the opening portion which is the through hole.

A brushless motor of a twelfth aspect is the brushless motor of any one of the first aspect to the eleventh aspect wherein: the control unit includes a heat sink; a plurality of mounted components that configure an electrical circuit on the circuit substrate, including the magnetism detection sensor, are mounted on one side surface in a substrate thickness direction of the circuit substrate; and the heat sink is superimposed on another side surface in the substrate thickness direction of the circuit substrate.

According to this brushless motor, the plural mounted components that configure the electrical circuit, including the magnetism detection sensor, are mounted on the one side surface in the substrate thickness direction (on one surface) of the circuit substrate. The configuration of the circuit substrate can accordingly be simplified, and mounting operations such as soldering can be performed all in one session, thereby reducing the cost of the circuit substrate.

Moreover, by single-side mounting the circuit substrate and superimposing the heat sink on the other side surface in the substrate thickness direction (the opposite side surface to the mounted surface) of the circuit substrate, the contact surface area of the circuit substrate with the heat sink can be increased. The cooling properties of the circuit substrate can accordingly be enhanced.

A brushless motor of a thirteenth aspect is the brushless motor of any one of the first aspect to the tenth aspect wherein it further includes a center piece that supports the stator section and the control unit, wherein: a press-fit hole is formed in the center piece; and the magnetism guide member is press-fitted into the press-fit hole.

According to this brushless motor, the press-fit hole is formed in the center piece, and the magnetism guide member is press-fitted into the press-fit hole. The magnetism guide member can accordingly be easily fixed to the center piece by press-fitting the magnetism guide member into the press-fit hole.

The assembility of the control unit can also be improved since there is no need to fix the magnetism guide member to the control unit.

A brushless motor of a fourteenth aspect is the brushless motor of the first aspect wherein: the control unit includes a heat sink and a resin member integrally formed to the heat sink; and the resin member is integrated to the magnetism guide member by integral molding.

According to this brushless motor, the resin member is integrally formed to the heat sink, and the resin member is integrated to the magnetism guide member by integral molding. The assembly operation of the magnetism guide member can accordingly be not necessary, and the assembly of the brushless motor can thereby also be improved.

Moreover, since the resin member and the magnetism guide member tightly adhere due to the integral molding, the tight sealing properties of the circuit chamber can be secured.

A motor according to a fifteenth aspect includes: a rotor section that includes a rotor magnet; a stator section that includes first core teeth sections on each of which a winding wire is wound in a forward winding direction, and each of which configures a forward winding section, and second core teeth sections on each of which a winding wire is wound in a reverse winding direction opposite to the forward winding direction, and each of which configures a reverse winding section, disposed facing the rotor magnet in a radial direction; and a magnetism detection section that detects magnetism generated from the rotor magnet, the magnetism detection section being disposed in a slot formed between one of the first core teeth sections and one of the second core teeth sections, which are adjacent to each other in a circumferential direction of the stator section and which are of the same phase, or being disposed further to a side of the rotor magnet than the slot.

According to the motor of the fifteenth aspect, the magnetic flux generated from the forward winding section and the magnetic flux generated from the reverse winding section cancel each other at the position of the magnetism detection section. Magnetism generated from the rotor magnet can accordingly be detected with good precision in the magnetism detection section, and the rotation position of the rotor section can also be detected with good precision.

A motor according to a sixteenth aspect is the motor of the fifteenth aspect wherein the magnetism detection section includes: a magnetism detection sensor that is disposed so as to be separated from a motor section configured by the rotor section and the stator section, and that is provided at a circuit section that drives the motor section; and a first magnetism guide member that is disposed between the motor section and the magnetism detection sensor, and that guides the magnetism towards the magnetism detection sensor.

According to the motor of the sixteenth aspect, the magnetism detection section is divided to the magnetism detection sensor and the first magnetism guide member. The magnetism detection sensor can accordingly be disposed separated from the motor section, and the degrees of freedom for arranging (disposing) the magnetism detection sensor can be increased.

A motor of a seventeenth aspect is the motor of the sixteenth aspect wherein: the forward winding sections and the reverse winding sections of a α-phase, a V-phase and a W-phase are provided; and the first magnetism guide member is disposed on a line that bisects an opening angle of the slot.

According to the motor of the seventeenth aspect, the first magnetism guide member is disposed in the middle (center) between the forward winding section and the reverse winding section, and magnetic flux generated from the forward winding section and magnetic flux generated from the reverse winding section cancel each other, thereby further reducing the magnetic flux generated from the forward winding section and the reverse winding section at the position of the first magnetism guide member. Magnetism generated from the rotor magnet can thereby be detected with better precision by the magnetism detection section.

A motor of an eighteenth aspect is the motor of the sixteenth aspect or the seventeenth aspect wherein: the stator section is disposed facing the rotor magnet and is disposed inside of the rotor section in the radial direction; at each of leading end outer faces of the one of the first core teeth sections and the one of the second core teeth sections which are adjacent to each other in the circumferential direction of the stator section, end portions thereof in a circumferential direction of the stator section are positioned further to an inner side of the stator section in the radial direction of the stator section than a central portion thereof in the circumferential direction of the stator section; and at least a portion of the first magnetism guide member is positioned further to an outer side of the stator section in the radial direction than an imaginary line connecting together an edge portion of the leading end outer face of the one of the first core teeth sections and an edge portion of the leading end outer face of the one of the second core teeth sections, which edge portions are adjacent to each other in the circumferential direction of the stator section.

According to the motor of the eighteenth aspect, at least the portion of the first magnetism guide member is positioned at a region which is further to the outer side of the stator section in the radial direction than the imaginary line, at which region there is no influence (not so much influence) from the magnetic flux generated from the forward winding section and the reverse winding section, so the magnetism generated from the rotor magnet can be detected with greater precision by the magnetism detection section.

A motor of a nineteenth aspect is the motor of any one of the sixteenth aspect to the eighteenth aspect further including a second magnetism guide member, wherein it further includes a second magnetism guide member that is disposed at an opposite side of the magnetism detection sensor from the first magnetism guide member, and that guides the magnetism towards the magnetism detection sensor.

According to the motor of the nineteenth aspect, the magnetism that is guided towards the magnetism detection sensor can be increased by the second magnetism guide member.

A motor of a twentieth aspect includes: a motor section that includes a rotor magnet; a magnetism detection sensor that is disposed so as to be separated from the motor section and that detects magnetism; a first magnetism guide member that is disposed between the motor section and the magnetism detection sensor and that guides magnetism generated from the rotor magnet towards the magnetism detection sensor; and a second magnetism guide member that is disposed at an opposite side of the magnetism detection sensor from the first magnetism guide member and that guides magnetism generated from the rotor magnet towards the magnetism detection sensor.

According to the motor of the twentieth aspect, as a magnetism guide member that guides magnetism generated from the rotor magnet towards the magnetism detection sensor, in addition to the first magnetism guide member disposed between the motor section and the magnetism detection sensor, the second magnetism guide member is disposed on the opposite side of the magnetism detection sensor to the first magnetism guide member. The magnetism guided towards the magnetism detection sensor can accordingly be increased, and the magnetism generated from the rotor magnet can thereby be detected with good precision even in a case in which the magnetism detection sensor is disposed with a separation from the motor section.

A motor of a twenty-first aspect is the motor of the twentieth aspect wherein the second magnetism guide member is disposed such that the magnetism detection sensor is sandwiched between the first magnetism guide member and the second magnetism guide member.

According to the motor of the twenty-first aspect, the second magnetism guide member is disposed such that the magnetism detection sensor is interposed (sandwiched) between the first magnetism guide member and the second magnetism guide member. Namely, the first magnetism guide member and the second magnetism guide member are disposed such that magnetism generated from the rotor magnet passes through from one face side of the magnetism detection sensor to the opposite face side of the magnetism detection sensor. The magnetism guided towards the magnetism detection sensor can accordingly be increased even further.

A motor of a twenty-second aspect is the motor of the twentieth aspect or the twenty-first aspect wherein the first magnetism guide member and the second magnetism guide member are each formed in a bar shape, and are disposed so as to be along the same straight line with length directions thereof oriented along an axial direction of the motor section.

According to the motor of the twenty-second aspect, the first magnetism guide member and the second magnetism guide member are each formed in a bar shape, and are disposed so as to be along the same straight line with their length directions oriented along the motor section axial direction. The magnetism generated from the rotor magnet can accordingly be efficiently guided towards the magnetism detection sensor.

A motor of a twenty-third aspect is the motor of any one of the twentieth aspect to the twenty-second aspect wherein the first magnetism guide member is retained on a placement body that places thereon a circuit substrate on which the magnetism detection sensor is mounted.

According to the motor of the twenty-third aspect, the first magnetism guide member is retained on the placement body that places the circuit substrate mounted with the magnetism detection sensor. Namely, the first magnetism guide member is retained by the placement body that places the circuit substrate with good positioning precision. The first magnetism guide member can accordingly be disposed with good positioning precision with respect to the magnetism detection sensor.

A motor of a twenty-fourth aspect is the motor of the twenty-third aspect wherein the placement body is formed with a circular cylindrical portion that positions an axial portion of the motor section.

According to the motor of the twenty-fourth aspect, the placement body is formed with the circular cylindrical portion that positions the axial portion of the motor section. The first magnetism guide member can accordingly be disposed with good positioning precision with reference to the axial portion of the motor section. It is thereby possible to dispose the first magnetism guide member at a position which is near the rotor magnet with good precision, and magnetism generating from the rotor magnet can be efficiently guided towards the magnetism detection sensor.

BRIEF DESCRIPTION OF THE DRAWINGS

Embodiments of the invention will be described in detail with reference to the following figures, wherein.

DETAILED DESCRIPTION OF THE INVENTION

First Exemplary Embodiment

Explanation First Follows Regarding a First Exemplary Embodiment of the Present Invention.

Figure 1:
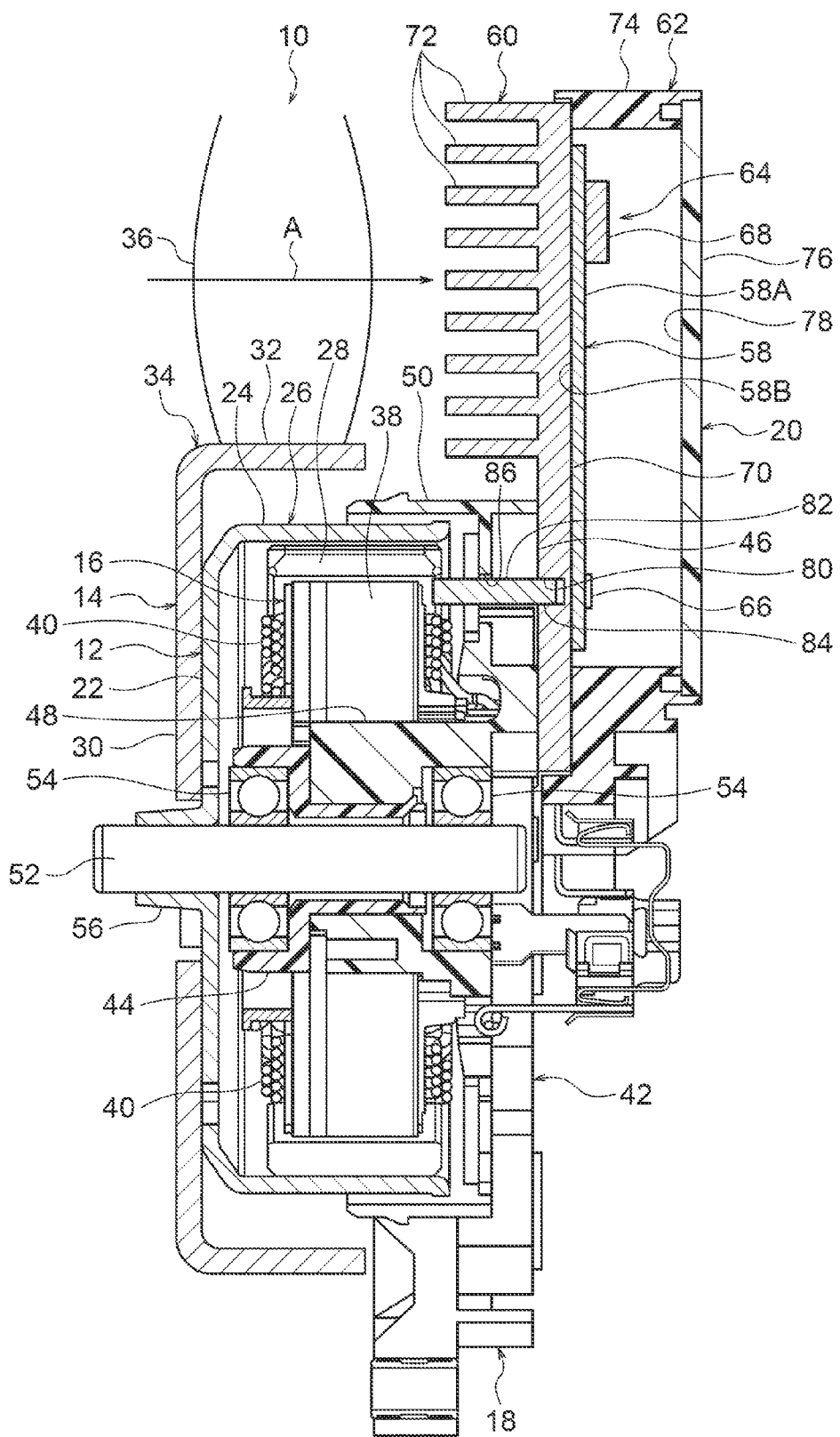
FIG. 1 is a side cross-section of a brushless motor according to a first exemplary embodiment of the present invention.

A fan motor 10 according to a first exemplary embodiment of the present invention and illustrated in FIG. 1 is an example of a brushless motor of the present invention. The fan motor 10 is, for example, a fan motor for cooling a radiator installed to a vehicle such as a passenger vehicle. The fan motor 10 is installed at a position in the vicinity of a radiator inside an engine compartment provided to a vehicle. The fan motor 10 includes a rotor 12, a fan 14, a stator 16, a center piece 18 and a control unit 20.

The rotor 12 includes a shallow cup shaped rotor housing 26 with a bottom section 22 and a peripheral wall section 24. A rotor magnet 28 is fixed to the inner peripheral face of the peripheral wall section 24 of the rotor housing 26.

The fan 14 is integrally fixed to the rotor 12. The fan 14 includes a shallow cup shaped fan boss 34 with a bottom section 30 and a peripheral wall section 32. The bottom section 30 is superimposed on the bottom section 22 of the rotor housing 26, and the peripheral wall section 32 is disposed at the radial direction outside of the peripheral wall section 24 of the rotor housing 26 with a gap.

Plural blades 36 are provided to the peripheral wall section 32 of the fan boss 34, extending towards the radial direction outside. Accompanying rotation of the fan 14, the plural blades 36 form a flow of air flowing from one axial direction side of the fan 14 towards the other axial direction side, as illustrated by arrow A.

The stator 16 is housed at the inside of the rotor housing 26. The stator 16 is disposed facing the rotor magnets 28 along the radial direction. The stator 16 has a ring shaped core 38, and winding wires (coils) 40 are wound on the core 38 via an insulator or the like.

The center piece 18 includes a lower center piece 42 and an upper center piece 44. The lower center piece 42 includes a substantially circular plate shaped main body section 46 that covers an opening of the rotor housing 26, and an axial (shaft) section 48 that projects out from a central portion of the main body section 46 towards the bottom section 22 of the rotor housing 26.

An umbrella section 50 is formed at a portion in a circumferential direction of the outer edge portion of the main body section 46, extending towards a side of the bottom section 22 of the rotor housing 26 and towards a side of a wall section (wall portion) 70 of a heat sink 60, described later. The umbrella section 50 is positioned further to the radial direction outside than the peripheral wall section 24 of the rotor housing 26. The umbrella section 50 is disposed at the vertical direction upper side of the peripheral wall section 24 of the rotor housing 26 when the fan motor 10 is in a vehicle installed state. The axial section 48 is press-fitted inside the core 38, and the stator 16 is accordingly supported by the axial section 48.

The upper center piece 44 is integrally fixed to the axial section 48. A motor shaft 52 is inserted through the inside of the upper center piece 44 and the axial section 48. The motor shaft 52 is thereby rotatably supported by a pair of shaft bearings 54 housed inside the upper center piece 44 and the axial section 48. A one end side of the motor shaft 52 is press-fitted into a cylinder (tube) section 56 formed to the bottom section 22 of the rotor housing 26. The rotor housing 26 is thereby fixed so as to be capable of rotating as one with the motor shaft 52.

The control unit 20 is disposed at one axial direction side with respect to the rotor 12 and the stator 16, integrally attached to and supported by the main body section 46 of the lower center piece 42. The control unit 20 is disposed further to the vertical direction upper side than a central portion of the rotor 12 (the motor shaft 52) when the fan motor 10 is in a vehicle installed state. The control unit 20 includes a circuit substrate (board) 58, the heat sink 60 and a circuit case 62.

The circuit substrate 58 is disposed with its thickness direction along the axial direction of the rotor 12, and is housed as described later in a circuit box (circuit chamber) 78 formed by the heat sink 60 and the circuit case 62. An electrical circuit, not shown in the drawings, is formed on the circuit substrate 58 and electrically connected to the coil 40. Plural mounted components 64 forming the electrical circuit are mounted to the circuit substrate 58 inside the circuit box 78.

Namely, the plural mounted components 64 are mounted at a one thickness direction side face 58A of the circuit substrate 58 (the face on the opposite side to the heat sink 60 side in this case). Components such as a magnetic flux detector (magnetism detection sensor) 66 and a control element (device) 68 (IC) are included in the plural mounted components 64. The magnetic flux detector 66 is disposed on an extension line of a magnetic flux guide member (magnetism guide member) 82, described later, and the magnetic flux detector 66 detects magnetic flux (magnetism), from the rotor magnet 28, that has been guided by the magnetic flux guide member 82.

The heat sink 60 is provided to the circuit substrate 58 on the main body section 46 side (the rotor 12 side). The heat sink 60 includes the wall section 70 extending along the circuit substrate 58, and plural fins 72 that extend out from the wall section 70 towards the blade 36 side. Another thickness direction side face 58B of the circuit substrate 58 (the face on the opposite side to the face on which the plural mounted components 64 are mounted) is superimposed on the wall section 70. A member with heat transfer properties (thermal conductivity) such as a rubber may be interposed between the wall section 70 and the other thickness direction side face 58B of the circuit substrate 58. The plural fins 72 are provided at positions that face along the fan 14 axial direction to the blade 36.

The circuit case 62 includes a ring shaped peripheral wall member 74 that passes through along the rotor 12 axial direction, and a lid member 76 that closes off the opening of the peripheral wall member 74 on the opposite side to the rotor 12 side. The heat sink 60 is disposed at the rotor 12 side of the peripheral wall member 74, and the wall section 70 of the heat sink 60 closes off an opening on the rotor 12 side of the peripheral wall member 74. The substantially sealed (closed) circuit box 78 is formed by the wall section 70, the peripheral wall member 74 and the lid member 76.

Figure 3:
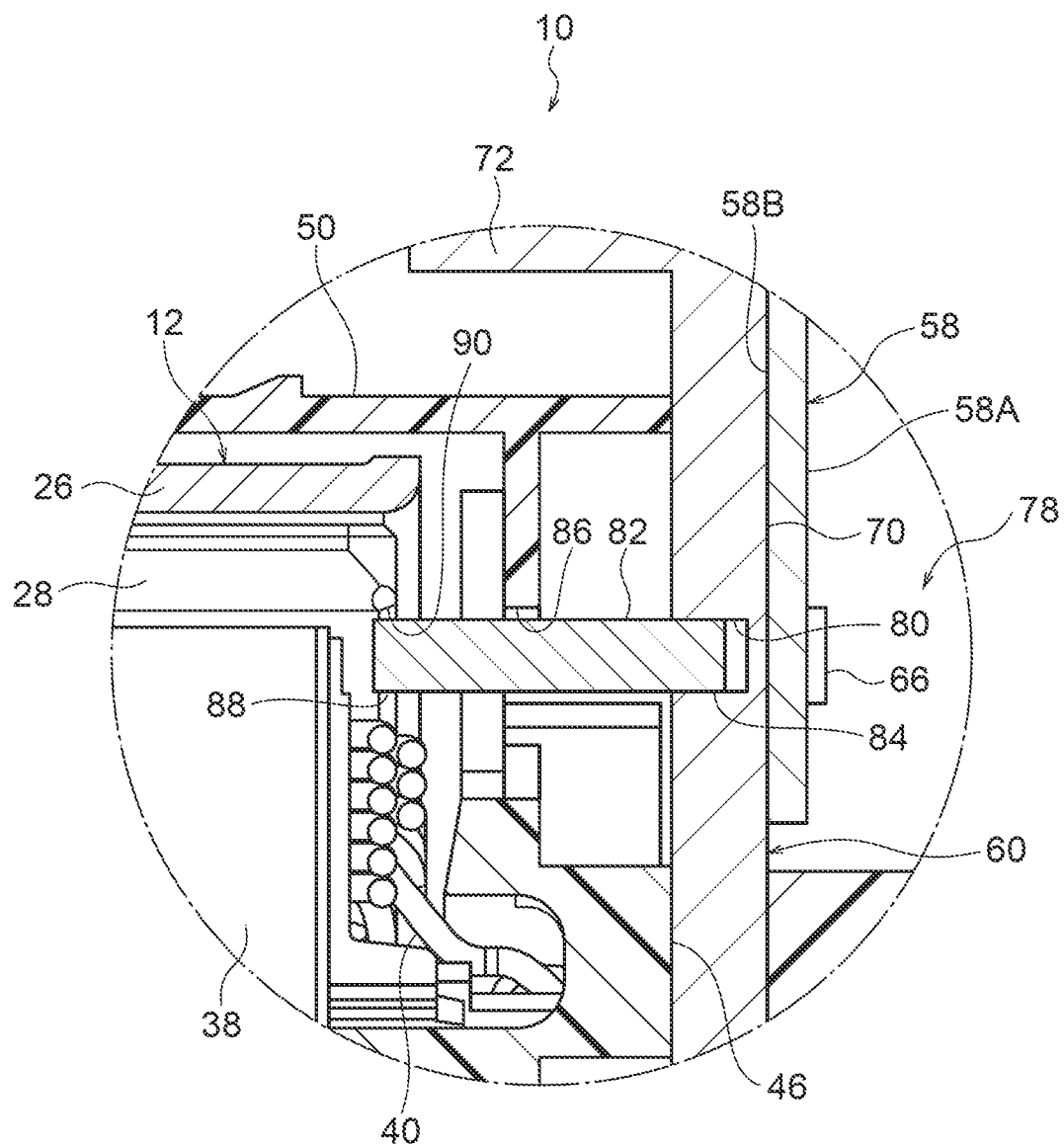
FIG. 3 is an enlarged drawing of relevant portions in FIG. 1.

As illustrated in FIG. 1 and FIG. 3, a recessed portion 80 is formed in the heat sink 60 at a position corresponding to the magnetic flux detector 66. The recessed portion 80 serves as an example of an opening portion of the present invention and is open to the opposite side to the circuit substrate 58 side (is open to the rotor 12 side).

The magnetic flux guide member 82 is provided extending along the rotor 12 axial direction between the magnetic flux detector 66 and the rotor magnet 28. The magnetic flux guide member 82 is formed from a material through which magnetic flux passes, such as for example iron. Note that preferably the surface of the magnetic flux guide member 82 is subjected to antirust treatment in a case in which the magnetic flux guide member 82 is formed from iron.

Figure 2:
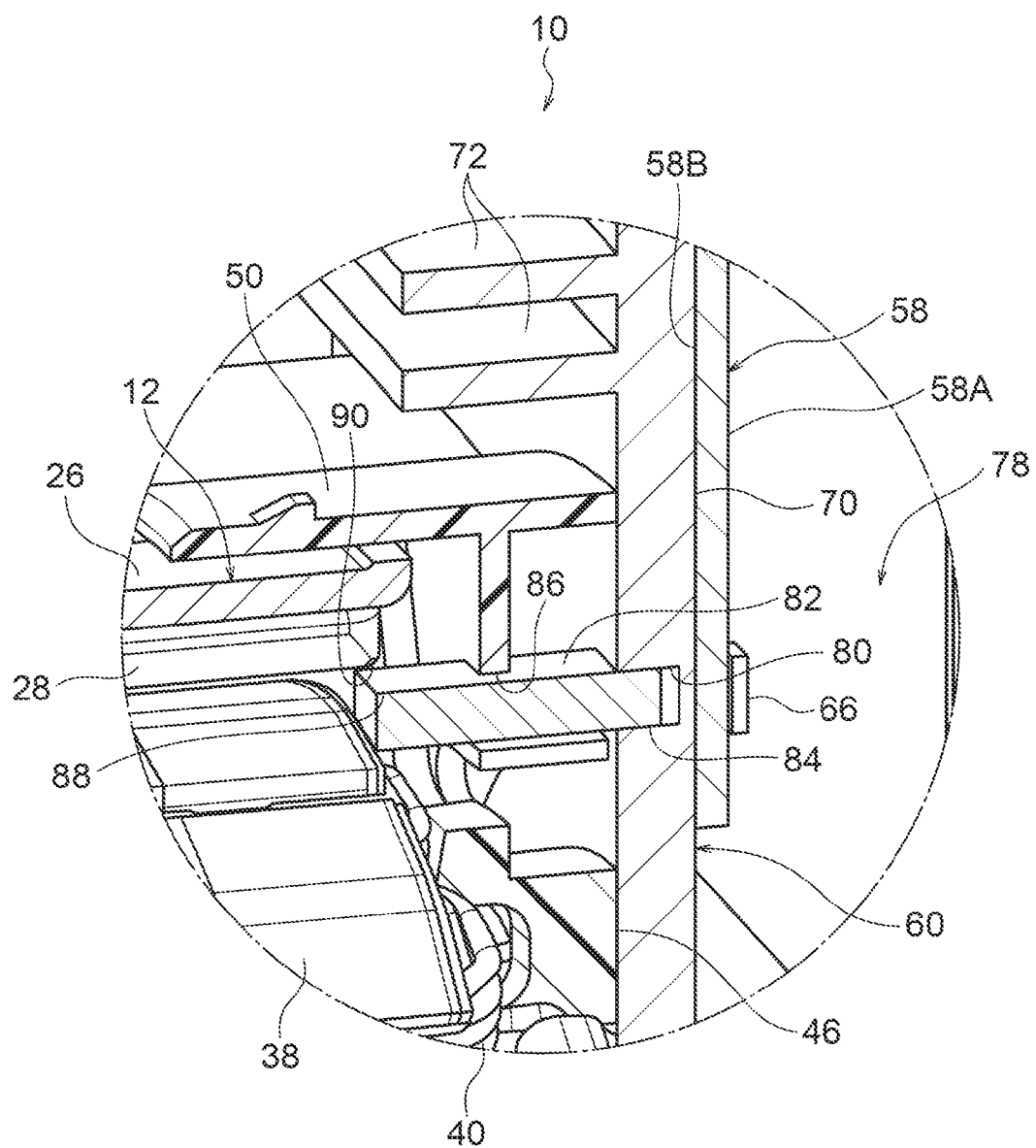
FIG. 2 is a perspective view including a partial cross-section of a magnetic flux guide member and a peripheral edge portion thereof shown in FIG. 1.
Figure 4:
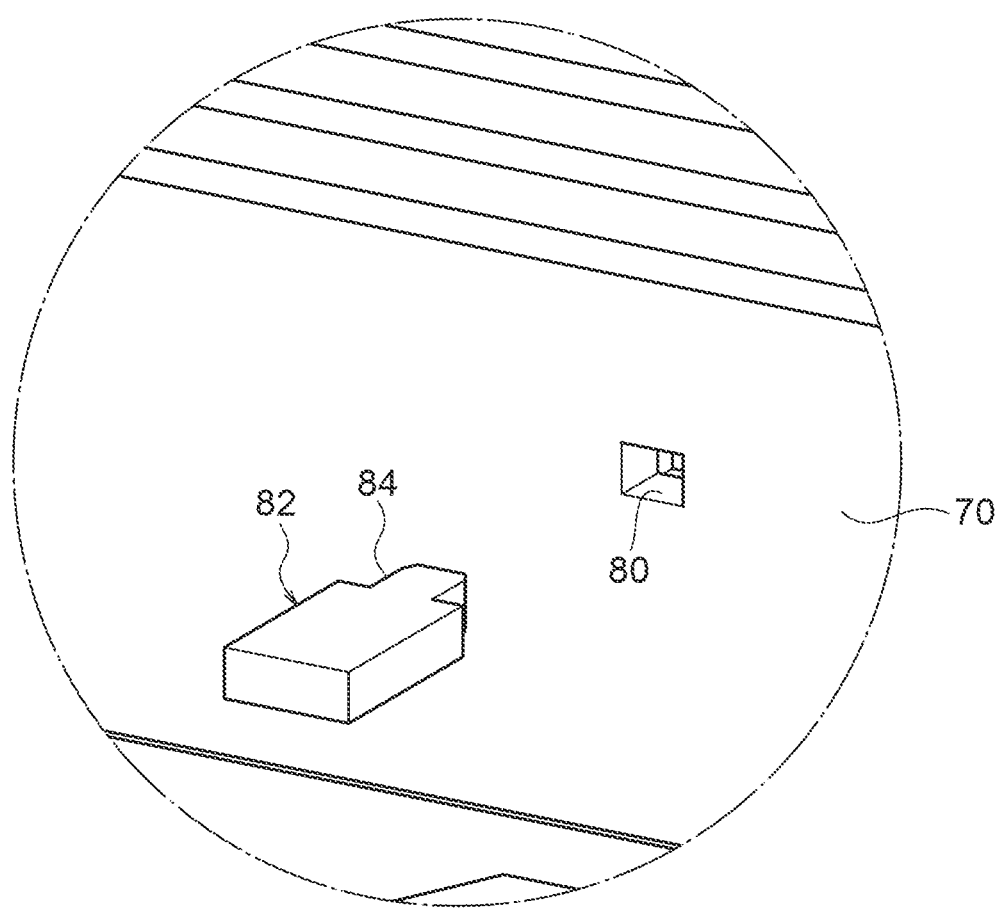
FIG. 4 is an exploded perspective view of a magnetic flux guide member and a peripheral edge portion thereof shown in FIG. 1.

A projection portion (convex portion) 84 is formed at the magnetic flux guide member 82, projecting out towards the circuit substrate 58 side (see FIG. 4). The projection portion 84 is inserted (for example press-fitted) into the recessed portion 80. Note that the leading end portion of the projection portion 84 may be separated from, or in contact with, the bottom portion of the recessed portion 80. The magnetic flux guide member 82 is inserted through a hole portion 86 formed in the main body section 46. An end portion 88 on the rotor 12 side of the magnetic flux guide member 82 is disposed facing, along the rotor 12 radial direction, to an end portion 90 on the opening side of the rotor magnet 28 (see FIG. 2 and FIG. 3).

In the fan motor 10 configured as described above, when a rotational magnetic field is formed by the stator 16 to the rotor magnet 28, attraction force and repulsion force are acted on the rotor magnet 28 due to the rotational magnetic field, and the rotor 12 rotates. When this occurs, a portion of the magnetic flux from the rotor magnet 28 is guided by the magnetic flux guide member 82 and detected by the magnetic flux detector 66.

The polarity of the magnetic flux detector 66 is switched when the magnetic poles of the rotor magnet 28 passing in the vicinity of the magnetic flux guide member 82 switch over accompanying rotation of the rotor 12. The timing of current flow flowing in the plural coils 40 is switched by the control device 68 according to the detection signal output from the magnetic flux detector 66 corresponding to this polarity switching.

Explanation follows regarding the operation and advantageous effects of the first exemplary embodiment of the present invention.

As explained in detail above, according to the fan motor 10 of the first exemplary embodiment of the present invention, the control unit 20 includes the circuit box 78 that houses and seals the circuit substrate 58, and the magnetic flux detector 66 is mounted to the circuit substrate 58 inside the circuit box 78. Water can accordingly be suppressed from making contact with the magnetic flux detector 66 even when the fan motor 10 is for example used in a water contact environment.

Moreover, the recessed portion 80 is formed in the wall section 70 configuring the circuit box 78 and the magnetic flux guide member 82 is inserted into the recessed portion 80. The portion of the magnetic flux guide member 82 that is inserted into the recessed portion 80 is accordingly disposed closer to the magnetic flux detector 66, and the detection precision of magnetic flux by the magnetic flux detector 66 can be improved.

The wall section 70 configuring the circuit box 78 is also configuring the heat sink 60 (the heat sink 60 is used as one of the members configuring the circuit box 78), and so the material used can be reduced. A reduction in size and reduction in cost of the fan motor 10 can accordingly be achieved.

The opening portion section into which the magnetic flux guide member 82 is inserted is configured by the recessed portion 80 (formed in a pocket shape instead of as a through hole), and so the tight sealing properties of the circuit box 78 can be secured whilst still disposing the magnetic flux guide member 82 closer to the magnetic flux detector 66.

The projection portion 84 is formed at the magnetic flux guide member 82, and the projection portion 84 is press-fitted into the recessed portion 80. The magnetic flux guide member 82 can accordingly be easily fixed to the control unit 20 by press-fitting the projection portion 84 into the recessed portion 80.

The plural mounted components 64 configuring the electrical circuit on the circuit substrate 58, including the magnetic flux detector 66, are mounted to the one thickness direction side face 58A (on a single face) of the circuit substrate 58. The configuration of the circuit substrate 58 can accordingly be simplified, and mounting operations such as soldering can be performed all in one session, enabling the cost of the circuit substrate 58 to be reduced.

Moreover, due to single-side mounting on the circuit substrate 58, the other thickness direction side face 58B of the circuit substrate 58 (the face on the opposite side to the mount-face) can be superimposed on the heat sink 60, thereby enabling the contact surface area between the circuit substrate 58 and the heat sink 60 to be increased. The cooling properties of the circuit substrate 58 can thereby be enhanced.

Explanation follows regarding modified examples of the first exemplary embodiment.

Figure 5:
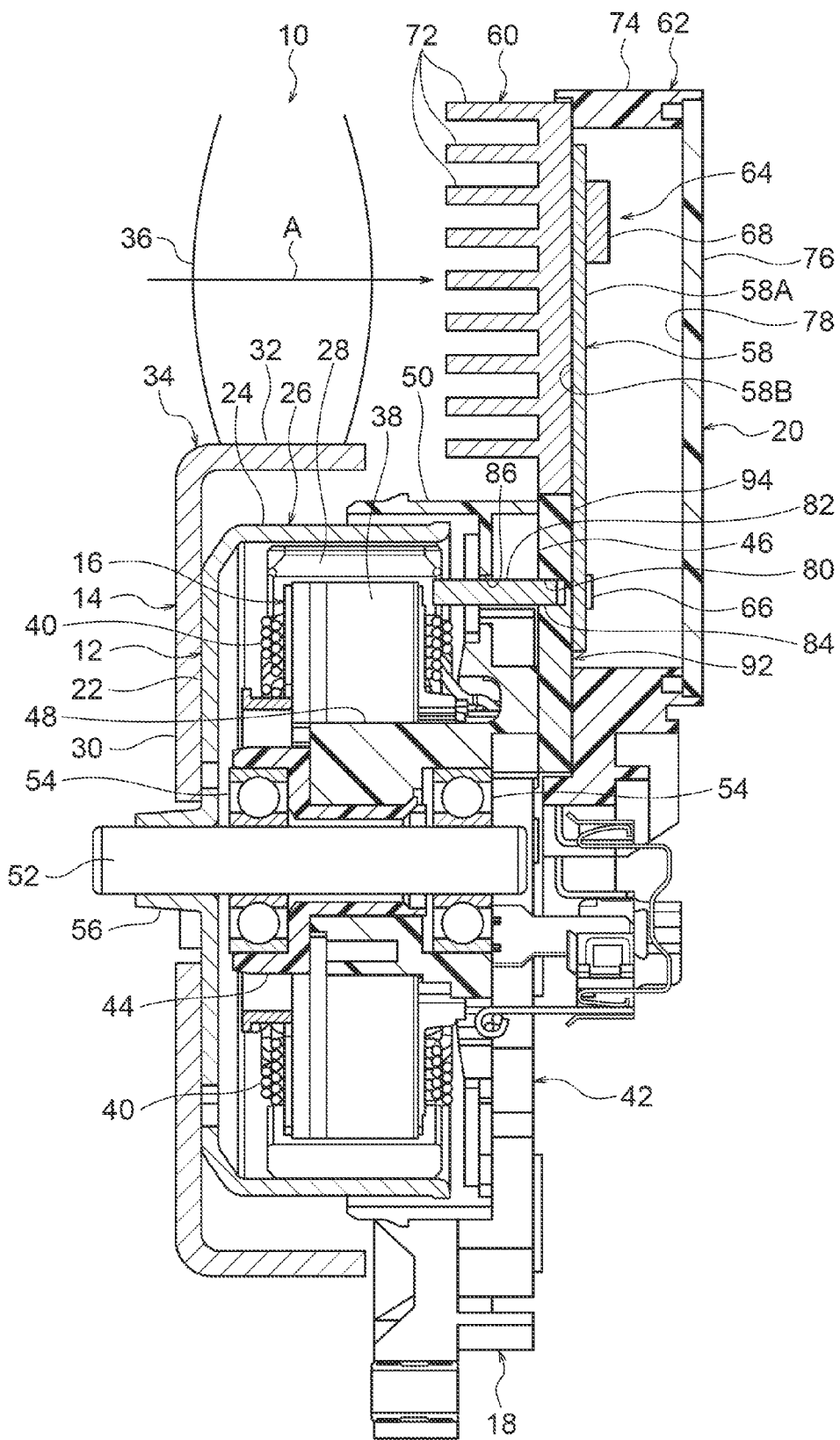
FIG. 5 is a side cross-section of a first modified example of a brushless motor according to the first exemplary embodiment of the present invention.

The first exemplary embodiment of the present invention may is configured, as illustrated in FIG. 5, such that a resin member 92 is integrally formed to the heat sink 60 and a wall section 94 configuring the circuit box 78 is formed by the resin member 92. The recessed portion 80 is formed in the wall section 94 as shown in FIG. 5.

The recessed portion 80 is accordingly formed in the resin member 92 through which magnetic flux readily passes (that is hard to diffuse the magnetic flux), enabling magnetic flux detection precision of the magnetic flux detector 66 to be secured.

Figure 6:
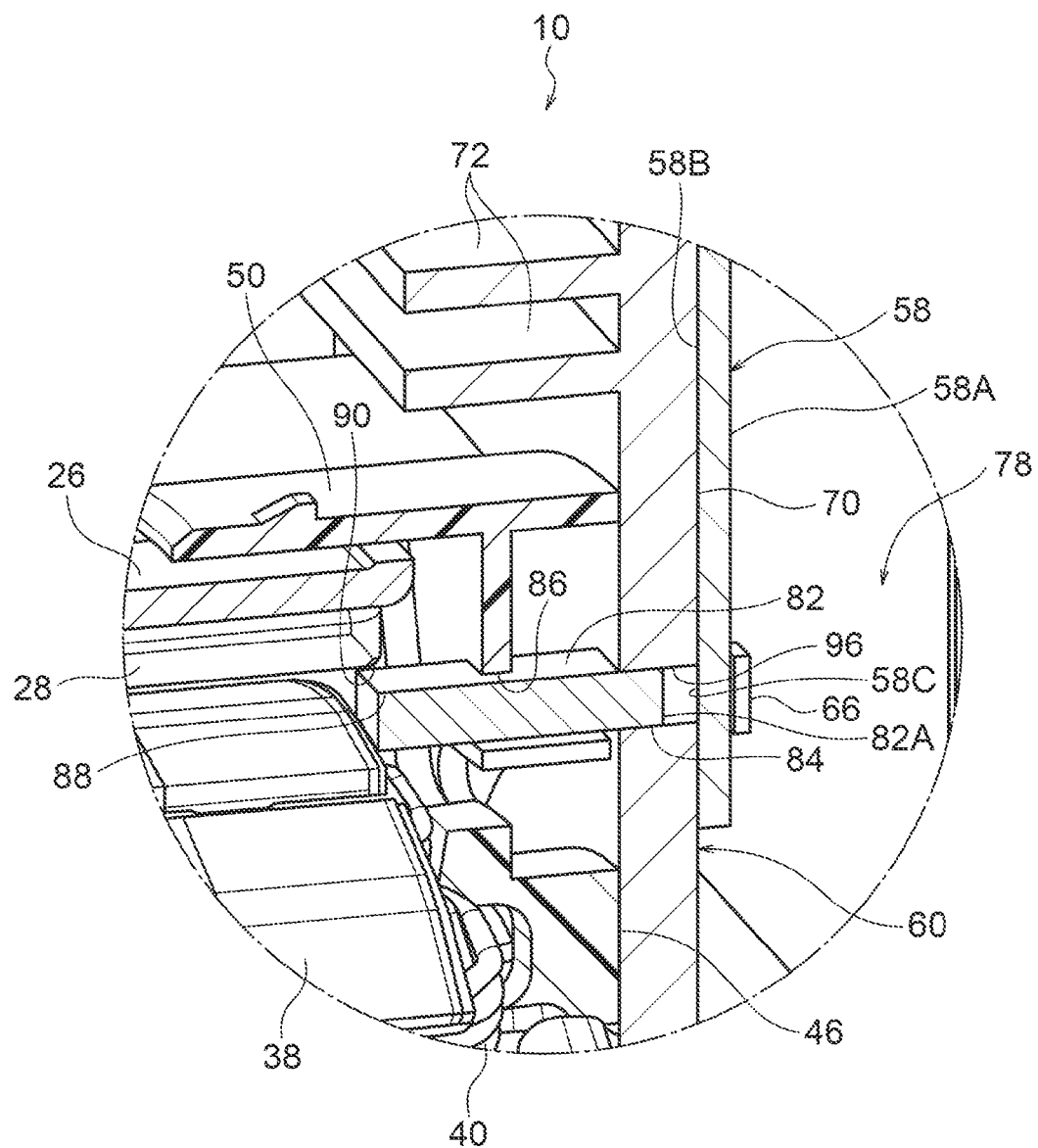
FIG. 6 is an enlarged perspective view including a partial cross-section of relevant portions of a second modified example of a brushless motor according to the first exemplary embodiment of the present invention.
Figure 7:
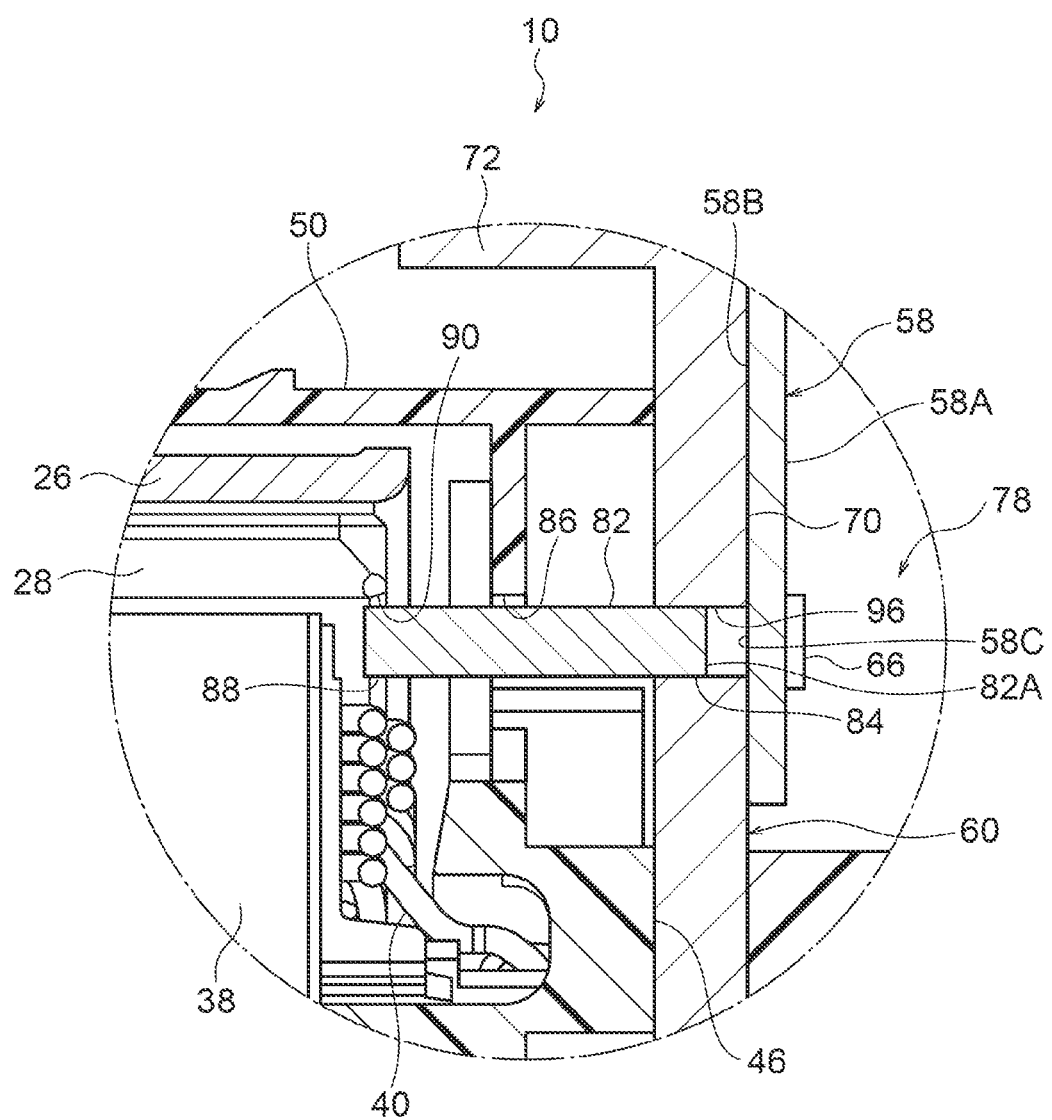
FIG. 7 is a side cross-section of a magnetic flux guide member and a peripheral portion thereof shown in FIG. 6.

Moreover, as illustrated in FIG. 6 and FIG. 7, a through hole 96 is formed in the wall section 70 of the heat sink 60 as an example of an opening portion. The projection portion 84 of the magnetic flux guide member 82 is inserted (for example press-fitted) into the through hole 96, such that a leading end portion 82A of the magnetic flux guide member 82 that has been inserted into the through hole 96, through the through hole 96, faces and is in close to a mount location 58C on the circuit substrate 58 for the magnetic flux detector 66.

Such a configuration disposes the magnetic flux guide member 82 even closer to the magnetic flux detector 66, enabling the magnetic flux detection precision of the magnetic flux detector 66 to be further enhanced. The sealing properties of the circuit box 78 can also be secured by press-fitting the projection portion 84 into the through hole 96.

Moreover, it is possible that the resin member 92 is integrally formed to the heat sink 60 such as illustrated in FIG. 5, and the through hole 96 is formed in the wall section 94 configured by the resin member 92.

Moreover, it is possible that the leading end portion 82A of the magnetic flux guide member 82 is project out further towards the magnetic flux detector 66 side than the through hole 96. Such a configuration enables the leading end portion 82A of the magnetic flux guide member 82 to be disposed even closer to the magnetic flux detector 66, and thereby enabling the magnetic flux detection precision of the magnetic flux detector 66 to be further enhanced.

In the modified example illustrated in FIG. 5, it is possible that the resin member 92 integrally formed to the heat sink 60 is integrated together with the magnetic flux guide member 82 by integral molding.

Such configuration renders assembly operation of the magnetic flux guide member 82 unnecessary, and enables good assembility of the brushless motor to be achieved. Moreover, the resin member 92 and the magnetic flux guide member 82 are closely adhered to each other by the integral molding, and so sealing properties of the circuit box 78 can be secured.

In the first exemplary embodiment of the present invention, the brushless motor of the present invention is applied to the fan motor 10, however it may be used in other applications.

Second Exemplary Embodiment

Explanation Follows Regarding a Second Exemplary Embodiment of the Present Invention.

Figure 8:
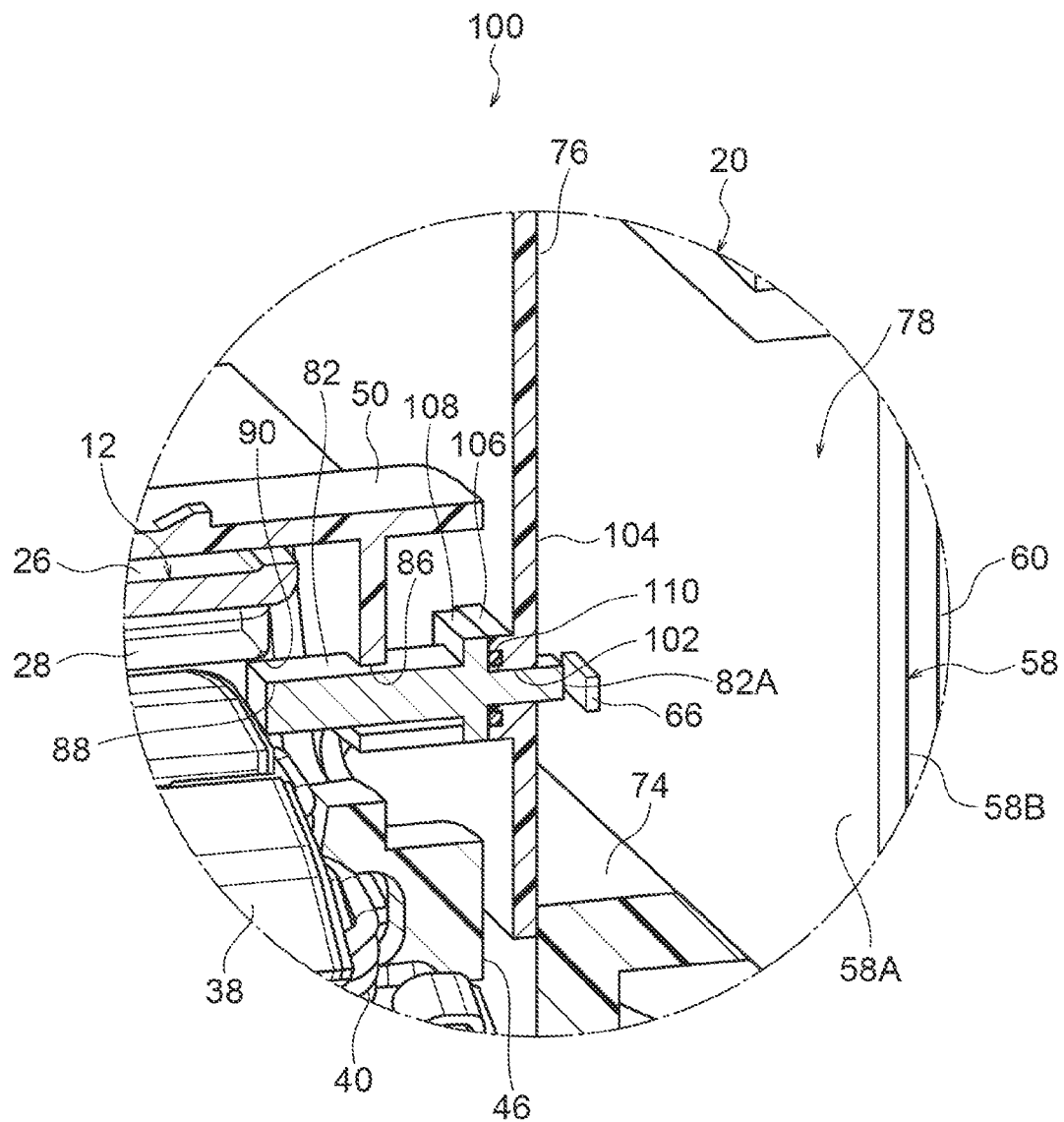
FIG. 8 is an enlarged perspective view including a partial cross-section of relevant portions of a brushless motor according to a second exemplary embodiment of the present invention.
Figure 9:
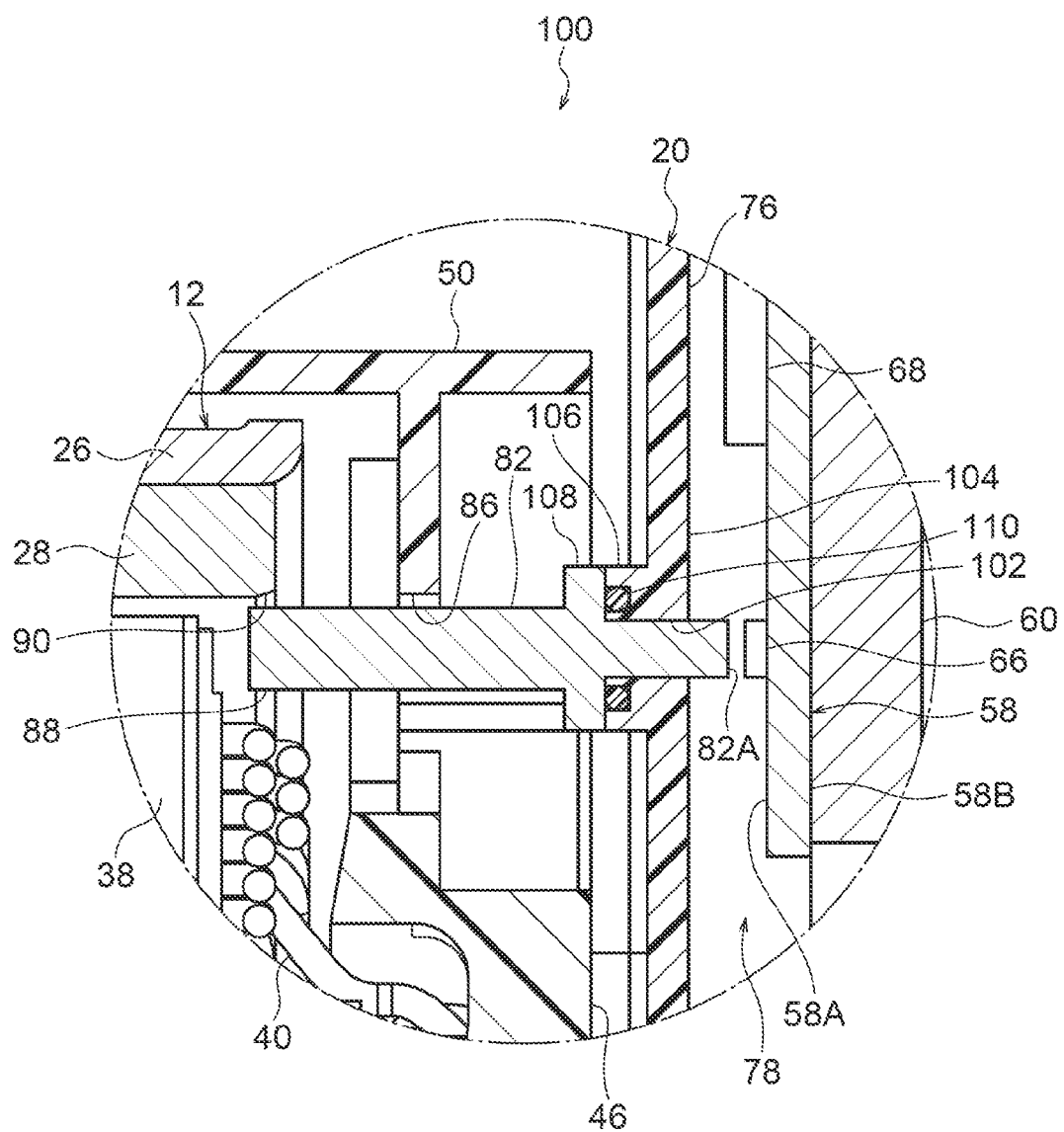
FIG. 9 is a side cross-section of a magnetic flux guide member and a peripheral edge portion thereof shown in FIG. 8.
Figure 10:
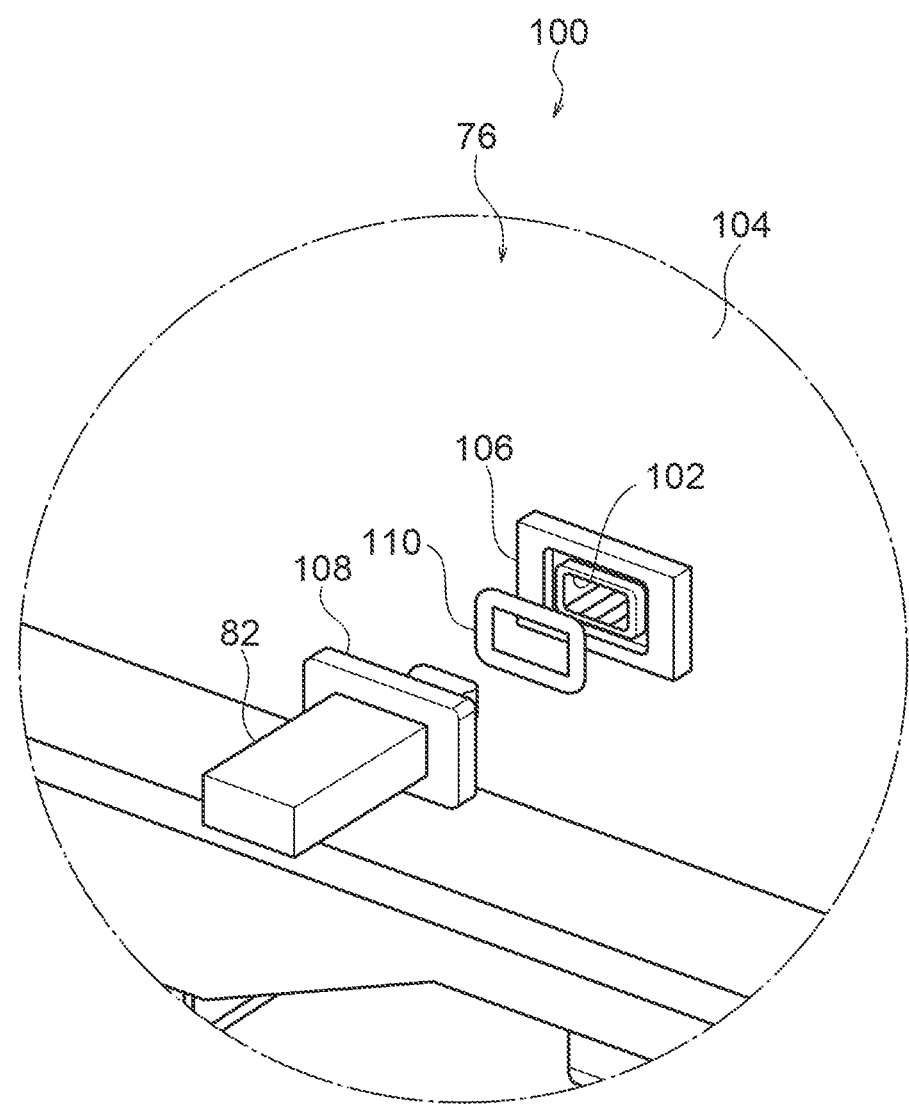
FIG. 10 is an exploded perspective view of the magnetic flux guide member and the peripheral edge portion thereof shown in FIG. 8.

A fan motor 100 (an example of a brushless motor) according to the second exemplary embodiment of the present invention illustrated in FIG. 8 to FIG. 10 has the following configuration modifications made with respect to the fan motor 10 according to the first exemplary embodiment of the present invention (including the modified examples).

Namely, a lid member 76 is provided on the rotor 12 side of the peripheral wall member 74, and a heat sink 60 is provided on the opposite side to the rotor 12 side of the peripheral wall member 74. A wall section 104 including a through hole 102 serving as an example of the opening portion is also formed at the lid member 76. The magnetic flux guide member 82 is inserted into (for example press-fitted into) the through hole 102.

One substrate thickness direction side face 58A of the circuit substrate 58 is directed towards the rotor 12 side. A leading end portion 82A of the magnetic flux guide member 82 is accordingly facing and in close to the magnetic flux detector 66. The leading end portion 82A of the magnetic flux guide member 82 also projects out further towards the magnetic flux detector 66 side than the through hole 102. Another substrate thickness direction side face 58B of the circuit substrate 58 is superimposed on the heat sink 60.

A projecting portion 106 is formed to the wall section 104 so as to project out towards the rotor 12 side, at a peripheral portion of the through hole 102, and a facing portion 108 is formed to the magnetic flux guide member 82 and is superimposed on the projecting portion 106. An O-ring 110, serving as an example of a seal member, is provided between the projecting portion 106 and the facing portion 108.

Explanation next follows of points of difference with respect to the first exemplary embodiment of the present invention regarding operation and advantageous effects of the second exemplary embodiment of the present invention.

As explained in detail above, according to the fan motor 100 of the second exemplary embodiment of the present invention, the through hole 102 is formed in the wall section 104, and the leading end portion 82A of the magnetic flux guide member 82 that has been inserted into the through hole 102, passes through the through hole 102 so as to face towards and be disposed in close to the magnetic flux detector 66. The magnetic flux guide member 82 is accordingly disposed even closer to the magnetic flux detector 66, enabling the magnetic flux detection precision of the magnetic flux detector 66 to be further enhanced.

In particular, the magnetic flux detector 66 is mounted to the one thickness direction side face 58A of the circuit substrate 58, that is directed towards the rotor 12 side (the face of the circuit substrate 58 on the magnetic flux guide member 82 side), and the leading end portion 82A of the magnetic flux guide member 82 and the magnetic flux detector 66 directly face each other. The magnetic flux detection precision of the magnetic flux detector 66 can accordingly be raised even further.

Moreover, the leading end portion 82A of the magnetic flux guide member 82 projects out towards the magnetic flux detector 66 side further than the through hole 102. The leading end portion 82A of the magnetic flux guide member 82 can accordingly be disposed even closer to the magnetic flux detector 66, enabling the magnetic flux detection precision of the magnetic flux detector 66 to be further enhanced.

The O-ring 110 is provided between the magnetic flux guide member 82 and the peripheral portion of the through hole 102, enabling sealing properties of the circuit box 78 to be secured.

Third Exemplary Embodiment

Explanation Follows Regarding a Third Exemplary Embodiment of the Present Invention.

Figure 11:
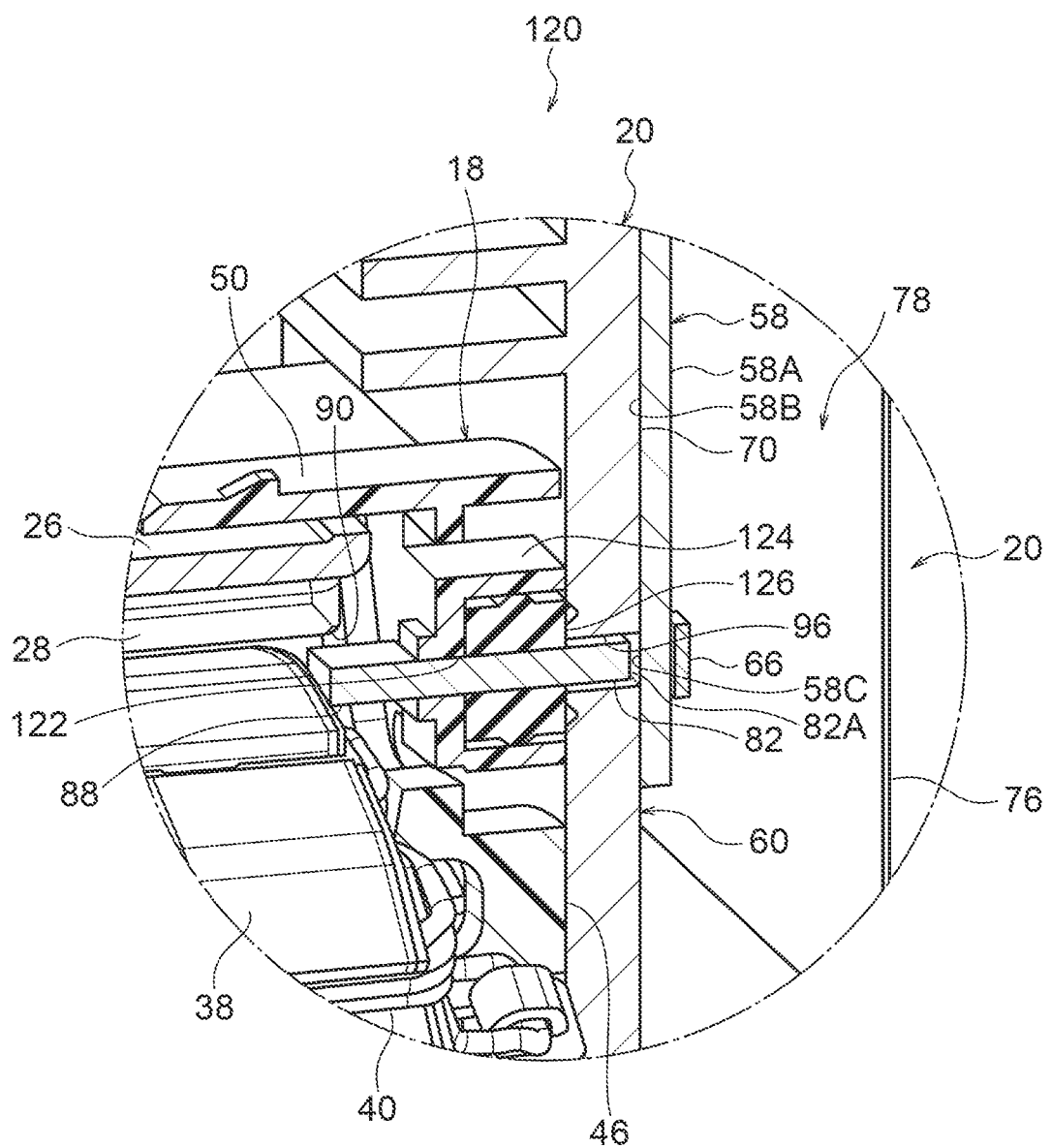
FIG. 11 is an enlarged perspective view including a partial cross-section of a brushless motor according to a third exemplary embodiment of the present invention.
Figure 12:
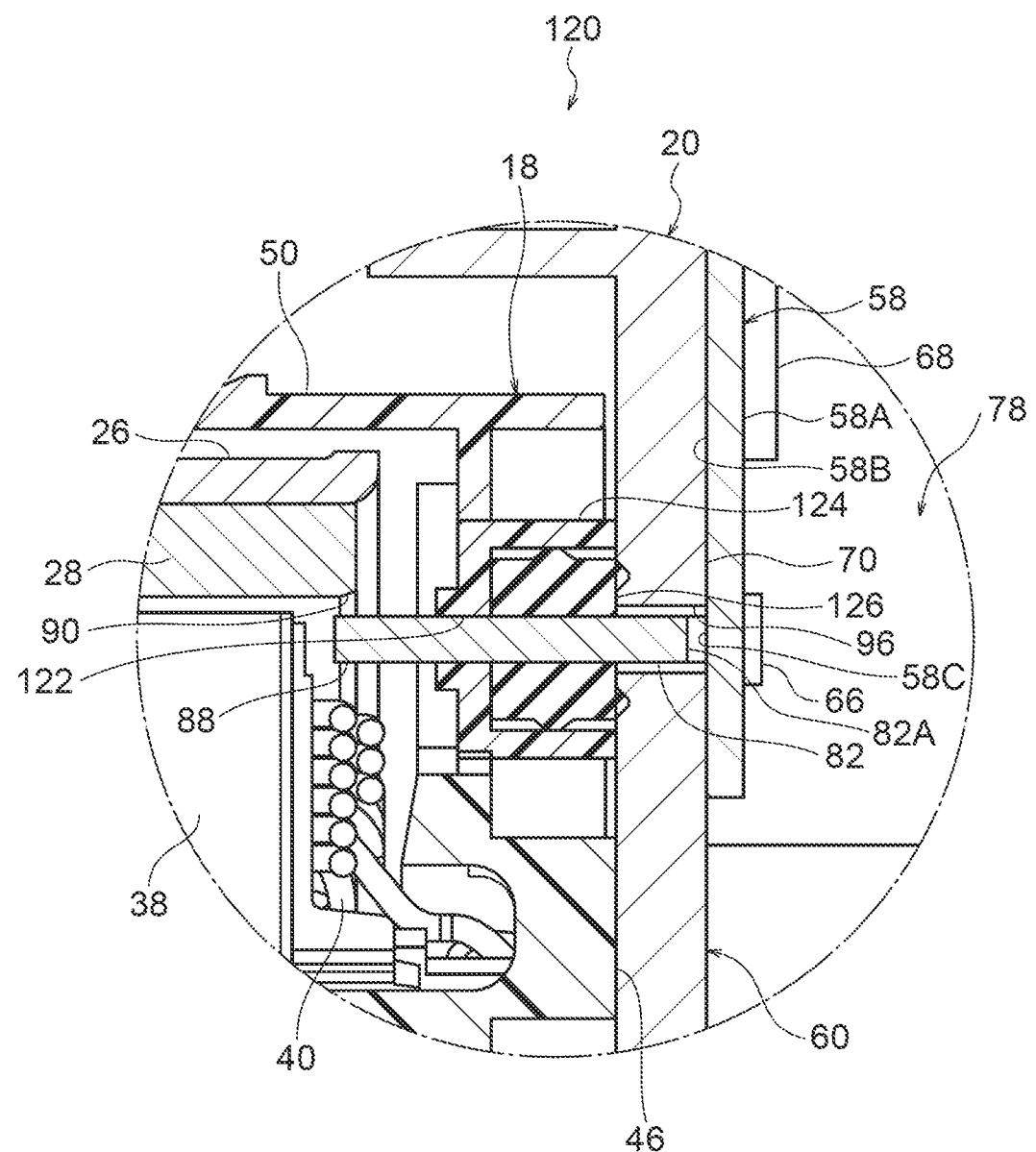
FIG. 12 is a side cross-section of a magnetic flux guide member and a peripheral edge portion thereof shown in FIG. 11.
Figure 13:
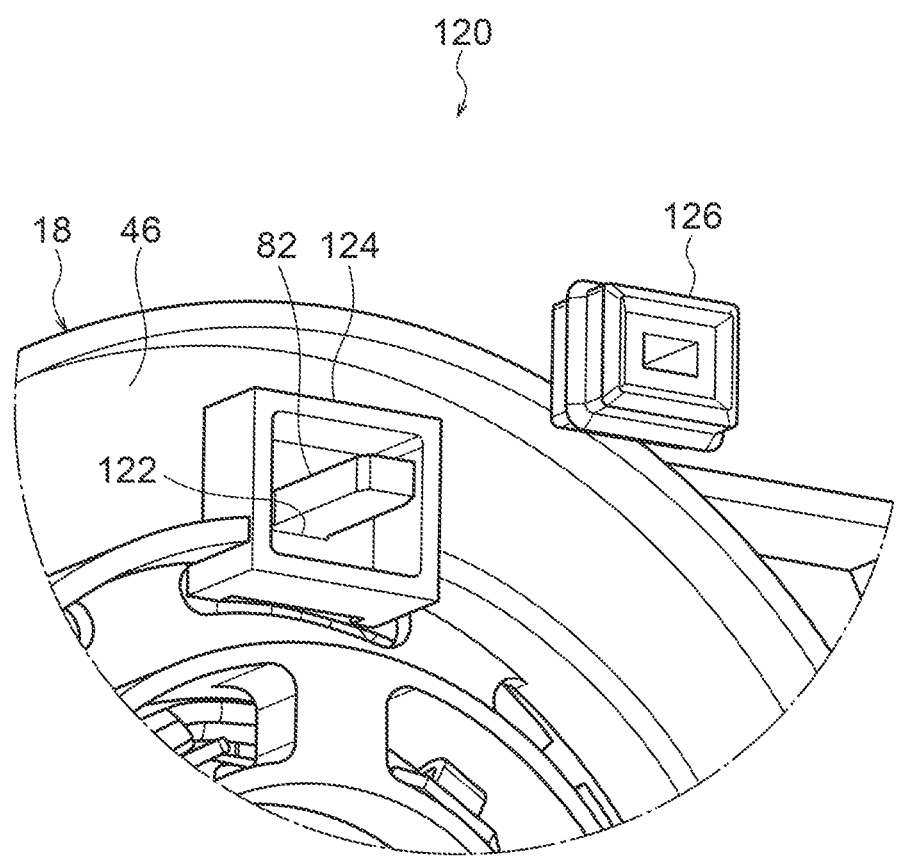
FIG. 13 is an exploded perspective view of the magnetic flux guide member and the peripheral edge portion thereof shown in FIG. 11.

A fan motor 120 (an example of a brushless motor) according to the third exemplary embodiment of the present invention, as illustrated in FIG. 11 to FIG. 13, has the following configuration modifications made with respect to the fan motor 10 according to the first exemplary embodiment of the present invention (including the modified examples).

A press-fit hole 122 is formed at a main body section 46 of a center piece 18, and a magnetic flux guide member 82 is inserted into the press-fit hole 122. A housing portion 124 is also formed at a peripheral portion of the press-fit hole 122 of the main body section 46, and a grommet 126 serving as an example of a seal member is housed in the housing portion 124.

Similarly to in a modified example of the first exemplary embodiment (see FIG. 6 and FIG. 7), a through hole 96 is formed in a wall section 70 of the heat sink 60. The magnetic flux guide member 82 is inserted into the through hole 96 in a state in which there is a gap between the inner peripheral face of the through hole 96 and the inserted magnetic flux guide member 82.

Explanation next follows regarding points of difference with respect to the first exemplary embodiment of the present invention regarding the operation and advantageous effects of the third exemplary embodiment of the present invention.

As described in detail above, according to the fan motor 120 of the third exemplary embodiment of the present invention, the grommet 126 is provided between the magnetic flux guide member 82 and the peripheral portion of the through hole 96, thereby enabling sealing properties of the circuit box 78 to be secured.

The press-fit hole 122 is formed to the center piece 18, and the magnetic flux guide member 82 is press-fitted into the press-fit hole 122. The magnetic flux guide member 82 can accordingly be easily fixed to the center piece 18 by press-fitting the magnetic flux guide member 82 into the press-fit hole 122.

There is also no need to fix the magnetic flux guide member 82 to the control unit 20, and so good assembly of the control unit 20 can be achieved.

Fourth Exemplary Embodiment

Explanation Follows Regarding a Fourth Exemplary Embodiment of the Present Invention.

Figure 14:
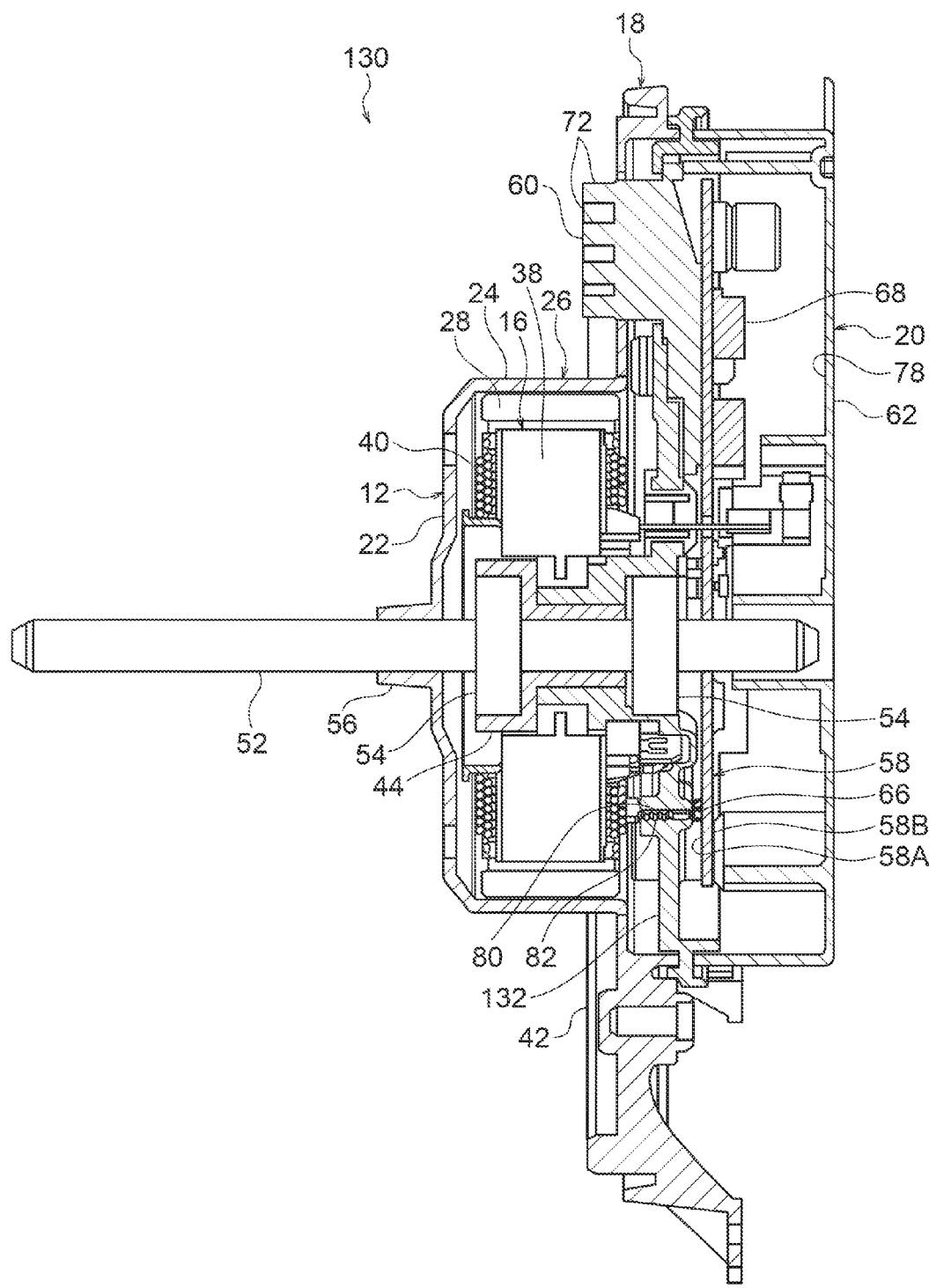
FIG. 14 is a side cross-section of a brushless motor according to a fourth exemplary embodiment of the present invention.
Figure 15:
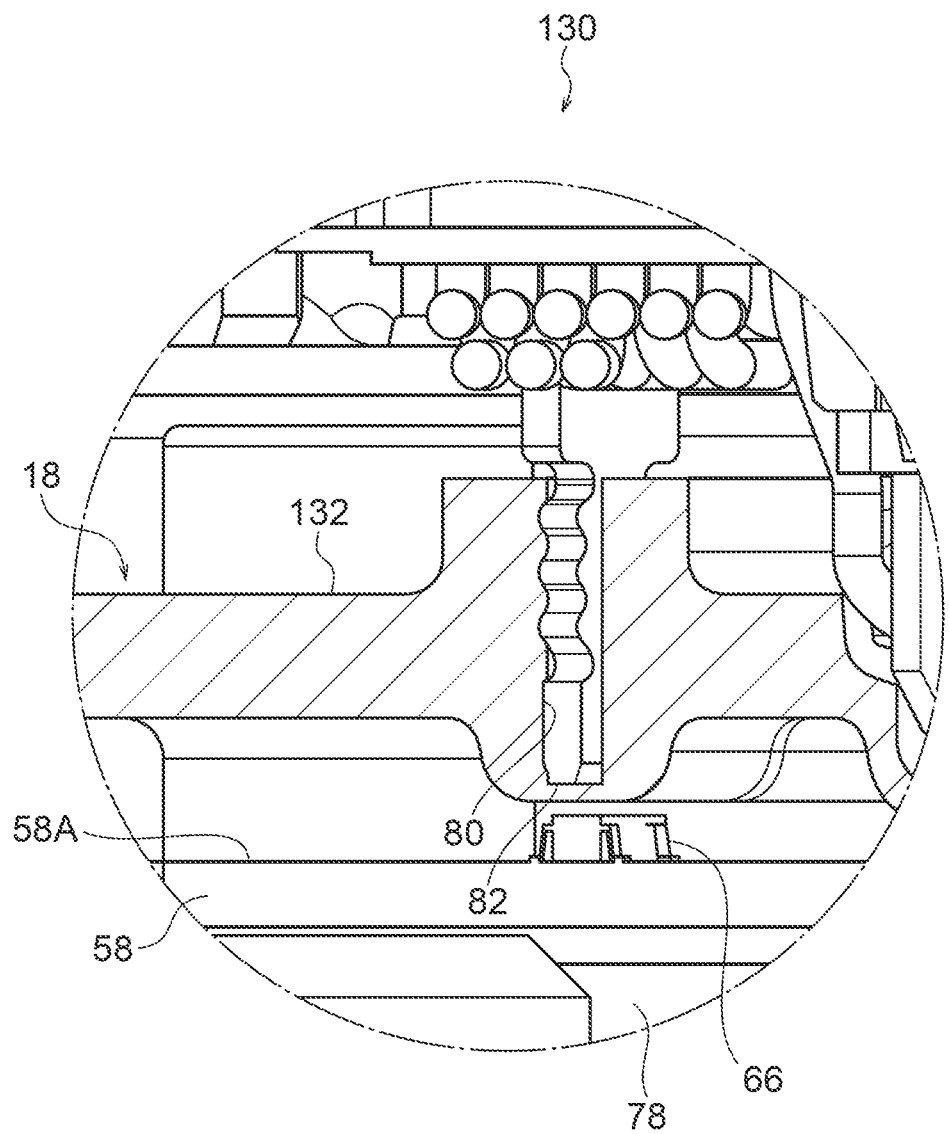
FIG. 15 is a perspective view including a partial cross-section of a magnetic flux guide member and a peripheral edge portion thereof shown in FIG. 14.

A fan motor 130 (an example of a brushless motor) according to the fourth exemplary embodiment of the present invention, as illustrated in FIG. 14 and FIG. 15, has the following configuration modifications made with respect to the fan motor 10 according to the first exemplary embodiment of the present invention (including the modified examples).

The center piece 18 includes a lid member 132 in addition to a lower center piece 42 and a upper center piece 44. The heat sink 60 is integrally assembled to the lid member 132. A circuit case 62 is formed in a recessed shape opening towards the rotor 12 side. The lid member 132 is formed in a plate shape, closing off the opening on the rotor 12 side of the circuit case 62. The lid member 132 configures a circuit box 78 together with the circuit case 62. A recessed portion 80 as described above is formed to the lid member 132, and the magnetic flux guide member 82 is inserted into the recessed portion 80 (for example press-fitted). Note that the lid member 132 serves as an example of the wall section configuring the circuit box.

Explanation follows regarding points of difference with respect to the first exemplary embodiment of the present invention in the operation and advantageous effects of the fourth exemplary embodiment of the present invention.

As described in detail above, according to the fan motor 130 of the fourth exemplary embodiment of the present invention, the center piece 18 is utilized as one of the members configuring the circuit box 78, enabling the material used to be reduced. A reduction in size and reduction in cost of the fan motor 130 can accordingly be achieved Note that in addition to considering the lid member 132 to be provided as a member of the center piece 18, it is also possible to consider the lid member 132 as being provided to the control unit 20.

Fifth Exemplary Embodiment

Explanation Next Follows Regarding an Example of a Motor According to a Fifth Exemplary Embodiment of the Present Invention.

Figure 16:
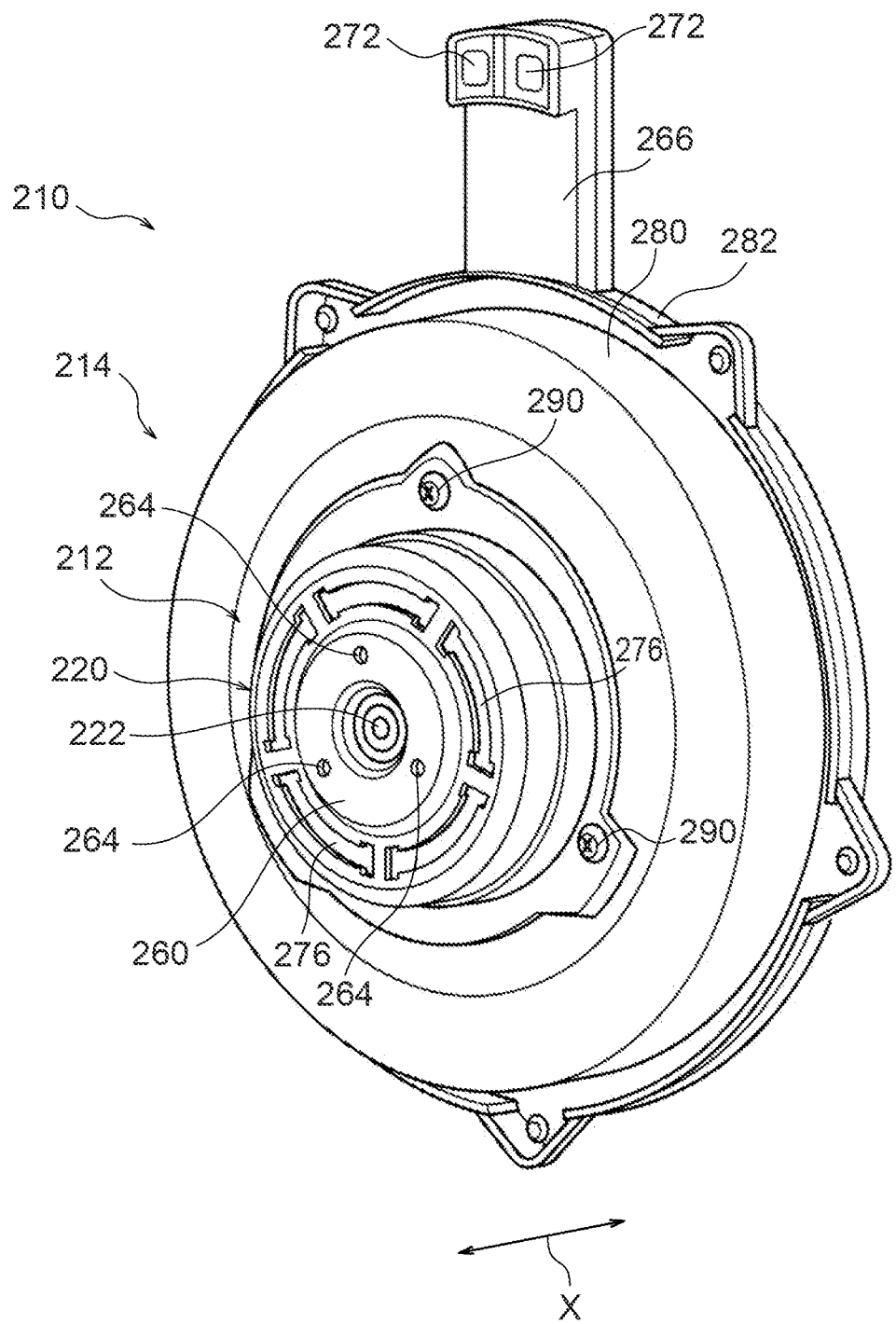
FIG. 16 is a perspective view illustrating an external view of a motor according to a fifth exemplary embodiment of the present invention.
Figure 17:
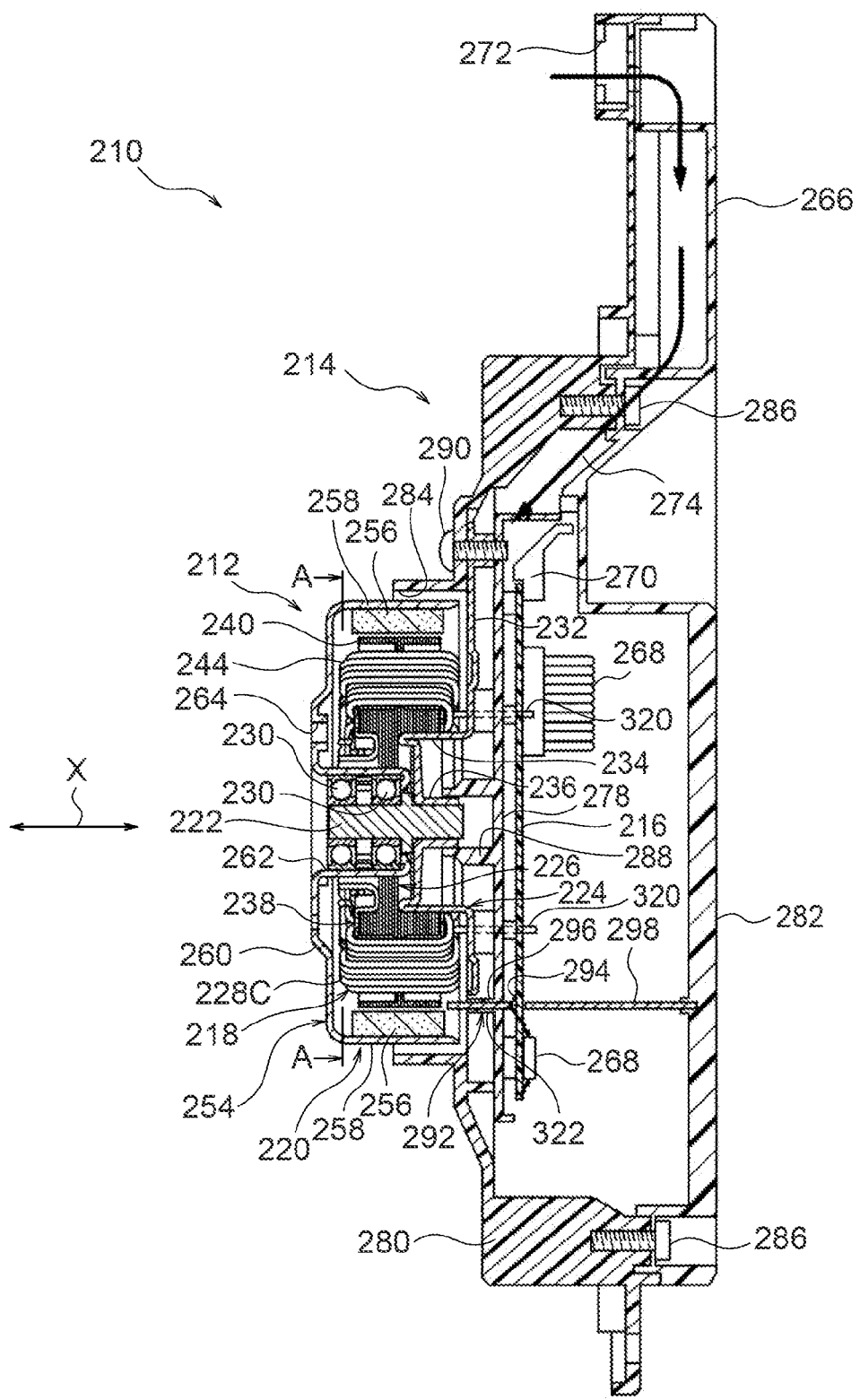
FIG. 17 is a cross-section of a motor according to the fifth exemplary embodiment of the present invention.

FIG. 16 is a perspective view illustrating the external appearance of a motor 210 according to a fifth exemplary embodiment of the present invention. FIG. 17 is a cross-section viewed from the side of the motor 210 according to the fifth exemplary embodiment of the present invention. The motor 210 is, for example, employed as a fan motor for cooling a radiator installed in a vehicle such as a passenger vehicle.

The motor 210 includes a motor section 212 and a housing section 214 that houses a circuit substrate 216 serving as a circuit section. The circuit substrate 216 is electrically connected to the motor section 212, and performs drive control of the motor section 212. Namely, the motor 210 is configured as a circuit-integrated motor in which the motor section 212 and the circuit substrate 216 are integrated together.

The motor section 212 is configured including a stator section 218 and a rotor section 220. The stator section 218 includes a motor shaft 222, a stator housing 224, a stator core 226, and coils (winding wires) 228A to 228F (only the coil 228C is depicted in FIG. 17). The motor shaft 222 is provided along the axial direction X of the motor 210, and the motor shaft 222 is provided with a shaft receiving portion (bearing) 230 that is disposed at a one end portion of the motor shaft 222 in the axial direction X on the side away from a housing section 214. The stator housing 224 is configured including a substantially flat plate shaped flat plate section 232, a recessed section 234 formed at a substantially central portion of the flat plate section 232, and a cylindrical section 236 formed at a substantially central portion of the recessed section 234. A portion at the other end of the motor shaft 222 is fixed to the inner peripheral face of the cylindrical section 236.

Figure 18:
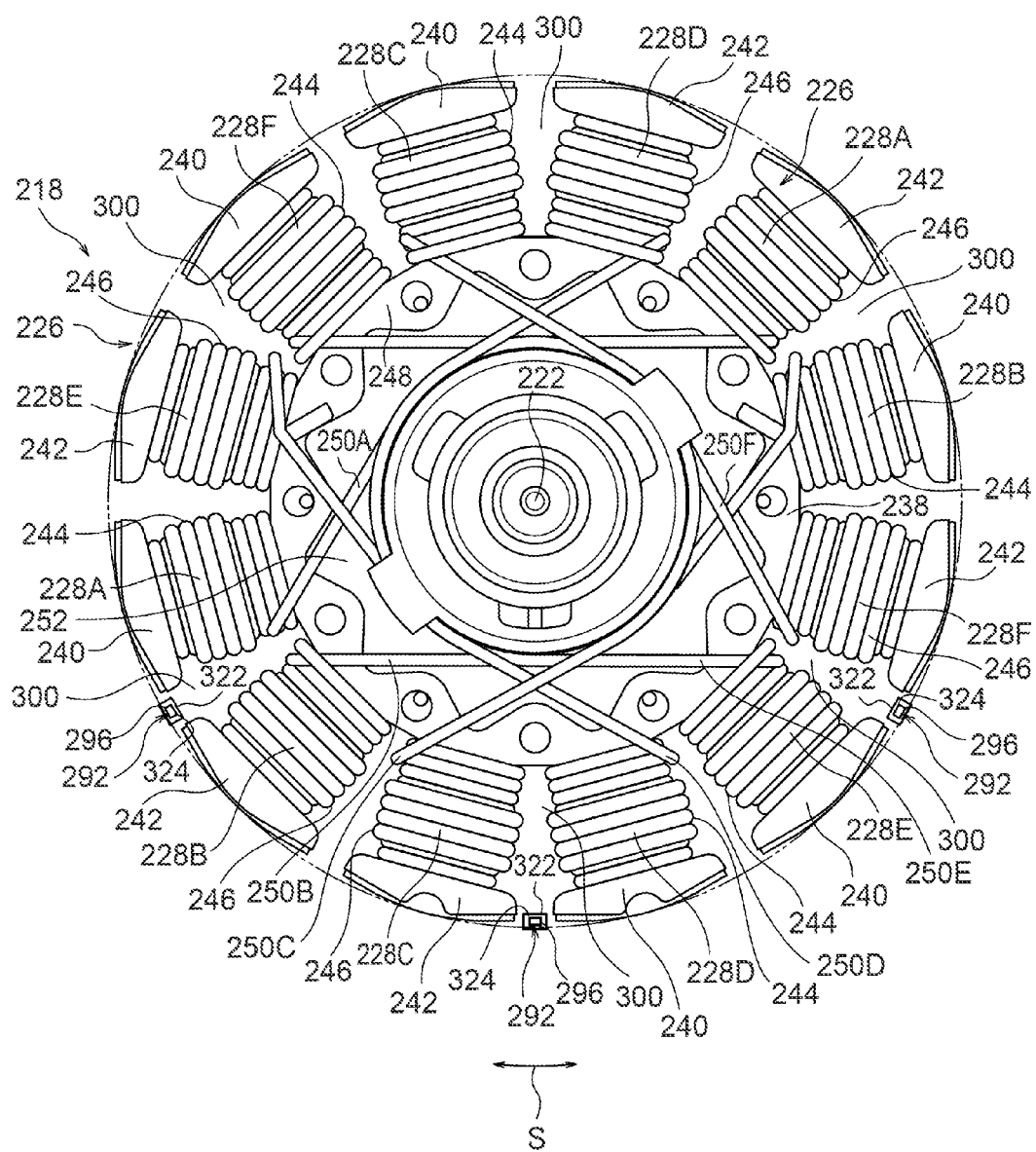
FIG. 18 is a drawing taken along arrow A-A of FIG. 17.

As illustrated in FIG. 18, a cross-section taken on arrow A-A of FIG. 17, the stator core 226 is configured including a ring shaped ring section 238, teeth sections 240 serving as first core teeth sections formed radially at the outer peripheral side of the ring section 238, and teeth sections 242 serving as second core teeth sections formed radially at the outer peripheral side of the ring section 238 and disposed adjacent to the teeth sections 240 along the ring section 238 circumferential direction.

The inner peripheral face of the ring section 238 is fixed to the outer peripheral face of the recessed section 234 of the stator housing 224. Forward winding sections 244, formed by the copper wire configured coils 228A to 228F wound in a forward winding direction, are provided at the teeth sections 240. Reverse winding sections 246, formed by the copper wire configured coils 228A to 228F wound in a reverse winding direction opposite to the forward winding direction, are provided at the teeth sections 242. In the present exemplary embodiment, the clockwise direction from the center of the stator core 226 towards the leading end portion of the teeth sections 240, 242 is the forward winding direction, and the anticlockwise direction from the center of the stator core 226 towards the leading end portion of the teeth sections 240, 242 is the reverse winding direction, this being the reverse direction to the forward winding direction.

Portions of the coils 228A to 228F connecting together the forward winding sections 244 and the reverse winding sections 246 configure crossing wires 250A to 250F. A recess shaped crossing wire escape section 252 is formed to one end face 248 of the ring section 238 at the far side from the housing section 214 in the axial direction X. The crossing wires 250A to 250F are disposed in a housed state dipping into the crossing wire escape section 252.

Coils 228A and 228B configure a U-phase, the coils 228C and 228D configure a V-phase, and the coils 228E and 228F configure a W-phase. Namely, the forward winding section 244 and the reverse winding section 246 formed by winding the coils 228A and 228B configure the U-phase, the forward winding section 244 and the reverse winding section 246 formed by winding the coils 228C and 228D configure the V-phase, and the forward winding section 244 and the reverse winding section 246 formed by winding the coils 228E and 228F configure the W-phase. The forward winding sections 244 and the reverse winding sections 246 of the same phase (U-phase, V-phase or W-phase) are accordingly disposed so as to be adjacent to each other along the circumferential direction S of the stator section 218.

As illustrated in FIG. 17, the rotor section 220 is provided with a rotor housing 254 and a rotor magnet 256. The rotor housing 254 is formed in a bottomed circular cylindrical shape including a side peripheral (circumference) section 258, a bottom section 260 integrated to the side peripheral section 258, and a recessed section 262 formed at a substantially central portion of the bottom section 260. The rotor magnet 256 is fixed to the inner peripheral face of the side peripheral section 258. The rotor magnet 256 is thereby disposed facing the teeth sections 240, 242 along the stator section 218 radial directions.

The bearing 230 is provided in the recessed section 262 of the rotor housing 254. The rotor section 220 is accordingly supported so as to be capable of rotating with respect to the stator section 218 about the motor shaft 222 as the central axis. Attachment holes 264 are provided to the bottom section 260 of the rotor housing 254, and rotated members such as a fan (not shown in the drawings) are attached at the attachment holes 264.

The housing section 214 internally houses the circuit substrate 216. As illustrated in FIG. 16, the housing section 214 is a member formed by integrating together a substantially circular plate shaped box member, and a cooling air intake section 266 that projects out to the outside of the box member (upwards in FIG. 16). Various electrical components 268 for controlling operation of the motor section 212 (only some of the electrical components 268 are shown in FIG. 17) and a heat sink 270 for cooling the electrical components 268 are provided at the circuit substrate 216. The heat sink 270 is provided at one end side of the circuit substrate 216, and disposed so as to face towards a path 274 in the cooling air intake section 266 through which cooling air that has been taken in through an inlet 272 passes.

Disposing the heat sink 270 so as to face towards the path 274 of the cooling air enables the electrical components 268 to be cooled without dust which is accompanied with the cooling air, entering in towards the electrical components 268. The cooling air that has passed by the heat sink 270 flows towards the motor section 212 and is externally discharged from an outlet 276 formed to the bottom section 260 of the rotor housing 254.

The housing section 214 is configured including a placement body 278 for placing the circuit substrate 216, a case body 280 that covers the placement body 278, and a cover body 282 that covers the case body 280. The motor section 212 is housed inside a housing recess portion 284 formed in the bottom section of the case body 280. The cover body 282 is fixed to the case body 280 by fixing screws 286, and the placement body 278 is fixed to the case body 280 by fixing screws 290.

The placement body 278 mounts thereat the circuit substrate 216 with good positioning precision. The placement body 278 includes a circular cylindrical portion 288 formed projecting out towards the motor section 212 side. The cylindrical section 236 to which a portion at the other end of the motor shaft 222 is fixed is inserted into and fixed to the inner peripheral face of the circular cylindrical portion 288. The circular cylindrical portion 288 has the function of positioning the axis (the motor shaft 222) of the motor section 212.

Figure 19:
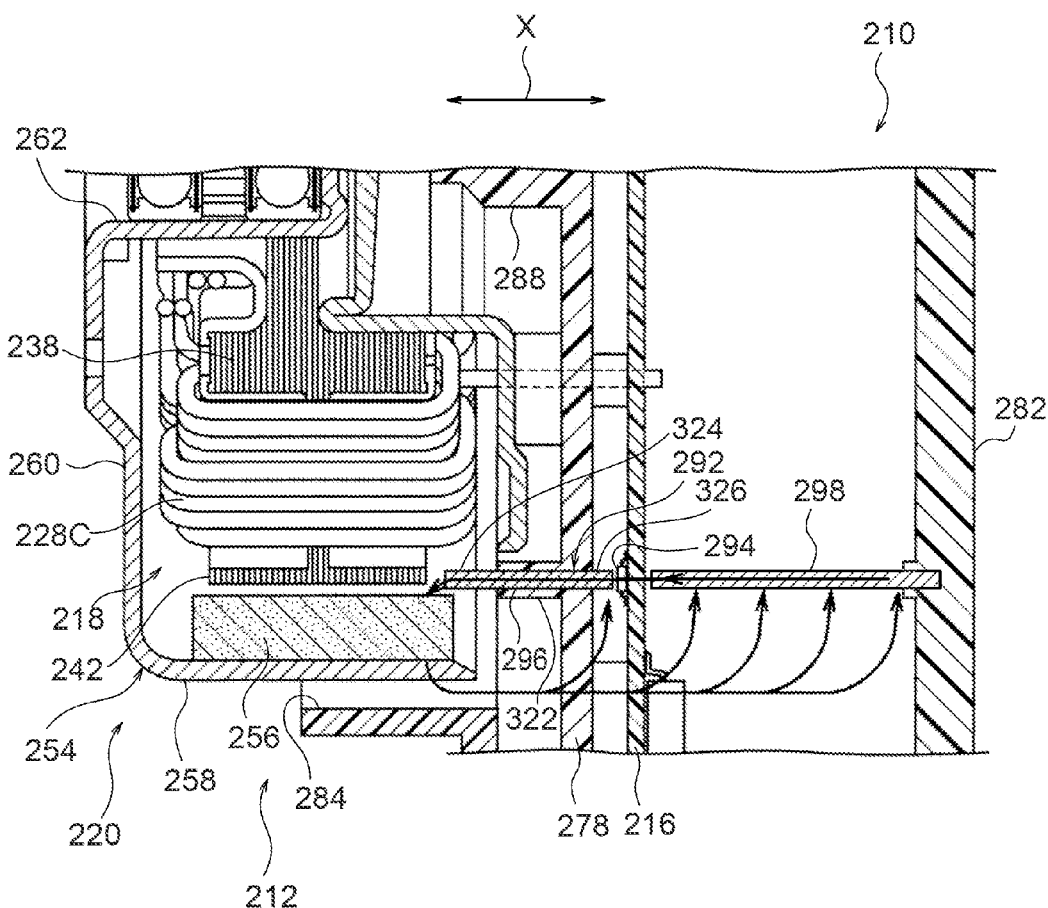
FIG. 19 is an explanatory drawing illustrating magnetism emanating from a rotor magnet according to the fifth exemplary embodiment of the present invention being guided towards a magnetism detection sensor.

As illustrated in FIG. 19 that shows an enlargement of a portion of the motor section 212, three magnetism detection sections 292 are disposed on the motor section 212 side of the circuit substrate 216 (only one of the magnetism detection sections 292 is shown in FIG. 19). The magnetism detection sections 292 are each configured with a magnetism detection sensor 294 and a first magnetism guide member 296. The magnetism detection sensors 294 are each disposed with a separation from the motor section 212, and the three magnetism detection sensors 294 are mounted on the circuit substrate 216 (only one of the magnetism detection sensors 294 is shown in FIG. 19). The magnetism detection sensors 294 function to detect the rotation position of the rotor section 220 with respect to the stator section 218 by detecting magnetism generating from the rotor magnet 256 of the motor section 212. The magnetism detection sensors 294 are for example be configured by Hall elements.

Each of the first magnetism guide members 296 is disposed between the motor section 212 and the corresponding magnetism detection sensor 294, and guides the magnetism generating from the rotor magnet 256 towards the magnetism detection sensor 294. A second magnetism guide member 298 is disposed on the opposite side of the magnetism detection sensor 294 to the first magnetism guide member 296 side, such that the magnetism detection sensor 294 is disposed between the first magnetism guide member 296 and the second magnetism guide member 298. The second magnetism guide member 298 guides magnetism generating from the rotor magnet 256 towards the magnetism detection sensor 294.

The first magnetism guide member 296 and the second magnetism guide member 298 are bar shaped members disposed along the axial direction X, and are each formed for example by a ferromagnetic body such as an iron member. The first magnetism guide member 296, the magnetism detection sensor 294 and the second magnetism guide member 298 are disposed along the same straight line. The first magnetism guide member 296 is retained by the placement body 278, and the second magnetism guide member 298 is retained by the cover body 282. The magnetism on the motor section 212 side that has generated from the rotor magnet 256 is accordingly guided towards the magnetism detection sensor 294 by the first magnetism guide member 296. Magnetism on the opposite side to that of the motor section 212 that has generated from the rotor magnet 256 is accordingly guided towards the magnetism detection sensor 294 by the second magnetism guide member 298.

Figure 20:
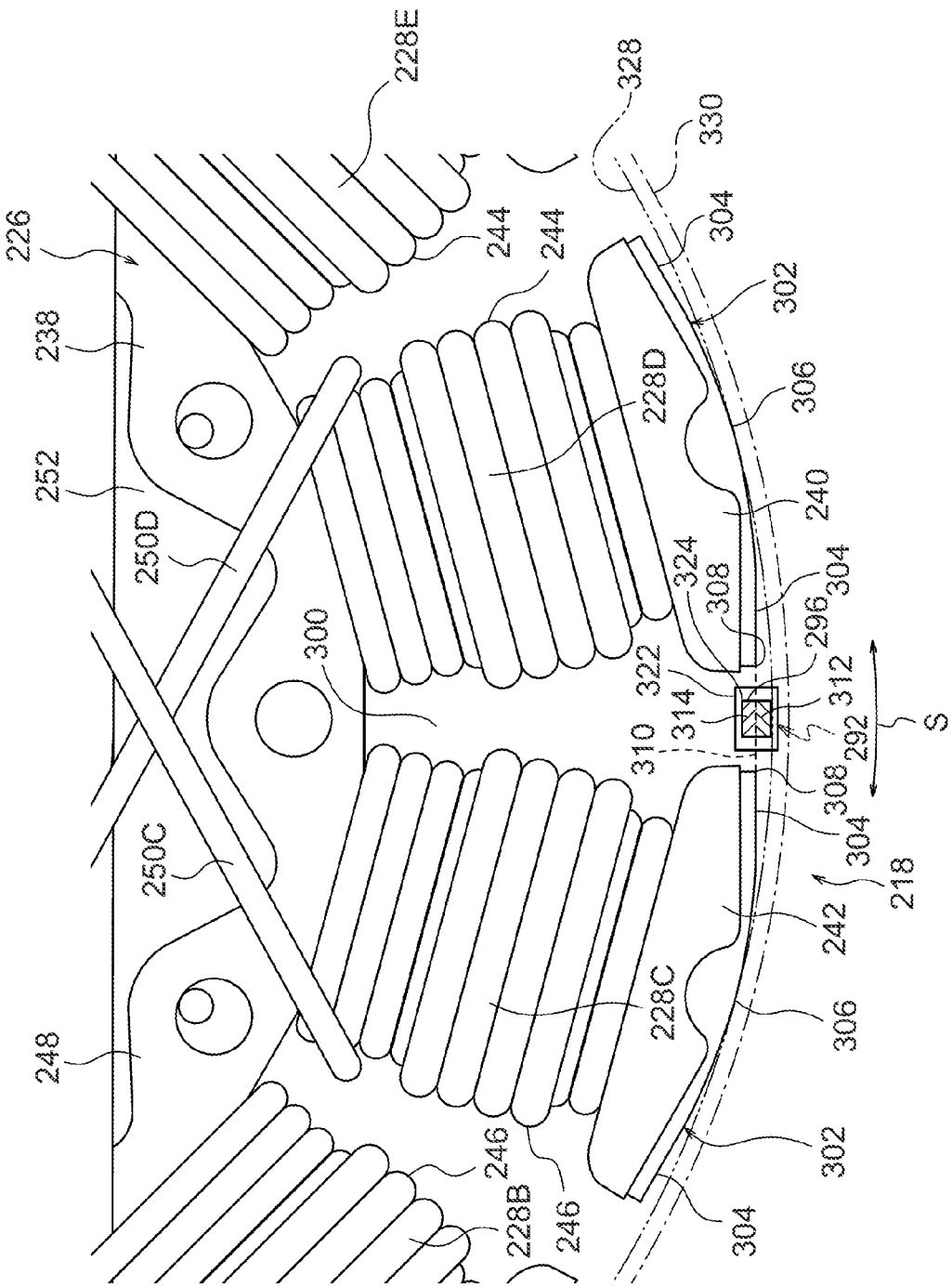
FIG. 20 is an enlarged drawing illustrating a stator section according to the fifth exemplary embodiment of the present invention.

As illustrated in FIG. 18 and in FIG. 20 that is an enlarged view showing a portion of the stator section 218 illustrated in FIG. 18, one end portion 324 on the motor section 212 side of the first magnetism guide member 296 is disposed on a line bisecting the opening angle of a slot 300 formed between the teeth section 240 (one of the teeth sections 240) and the teeth section 242 (one of the teeth sections 242) of stator section 218, which are adjacent in circumferential direction S and forward winding section 244 and reverse winding section 246 have the same phase. The magnetism detection sections 292 are disposed with one corresponding to each of the U-phase, the V-phase and the W-phase.

As illustrated in FIG. 20, leading end outside faces 302 of the teeth sections 240 and the teeth sections 242 (leading end outside faces 302 of the teeth section 240 and the teeth section 242 which are adjacent in the stator circumferential direction S) are each formed in a substantially umbrella shape such that end portions 304 in the stator section circumferential direction S of the leading end outside face 302 are positioned further to the inside in the stator section radial direction than a central portion 306 in the stator section circumferential direction S of the leading end outside face 302. A portion (region 312) of the one end portion 324 of the first magnetism guide member 296 is positioned further to the outside in the stator section 218 radial direction (the rotor magnet 256 side) than an imaginary line 310 connecting together an edge portion 308 in the stator circumferential direction S of the leading end outside face 302 of the teeth section 240 and an edge portion 308 in the stator circumferential direction S of the leading end outside face 302 of the teeth section 242 (the edge portions 308 are adjacent in the stator circumferential direction S).

Figure 21:
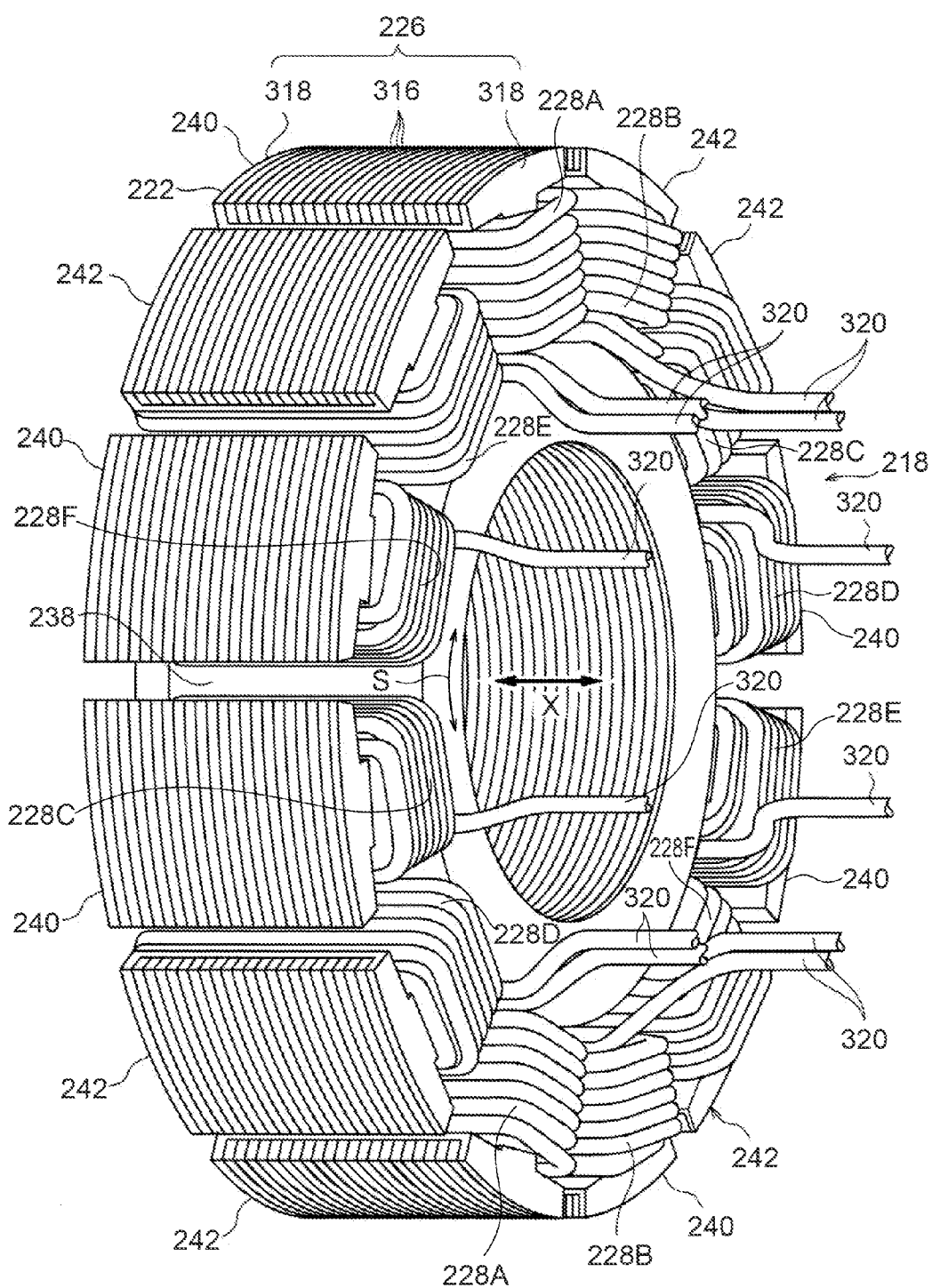
FIG. 21 is a perspective view illustrating a stator section according to the fifth exemplary embodiment of the present invention.

As illustrated in the perspective view of the stator section 218 as viewed from the housing section 214 side in FIG. 21, the stator core 226 of the stator section 218 is configured including a laminated core 316, in which plural stacked sheets of thin iron plate are fixed and integrated by caulking, and a synthetic resin insulator 318 that is installed so as to sandwich the laminated core 316 from both stacking direction sides. There are 6 "teeth section 240 and teeth section 242" of the stator core 226 provided so as to extend out radially from the ring section 238 (FIG. 21 is a view from the right hand side, with teeth sections 240, 242, 242, 240, 240, 242, 240, 242, 242, 240, 240, 242 disposed in sequence clockwise starting from the teeth section 240 on which the coil 228A is wound. The terminal end portions 320 of the coils 228A to 228F lead out towards the circuit substrate 216 (see FIG. 17) and are electrically connected to the circuit substrate 216.

As illustrated in FIG. 19, three retaining portions 322 are integrally formed to the placement body 278 (only one of the retaining portions 322 is shown in FIG. 19). The first magnetic guide members 296 are retained in the respective retaining portions 322. Therefore the three magnetism detection sensors 294 and the three end faces at the other end portions 326 of the first magnetism guide members 296 reliably face each other due to the three retaining portions 322 being integrally formed to the placement body 278 and the circuit substrate 216 mounted with the three magnetism detection sensors 294 being positioned with good precision with respect to the placement body 278. The three first magnetism guide members 296 are disposed with good positional precision with reference to the motor shaft 222 of the motor section 212 by integrally forming the three retaining portions 322 in the placement body 278 that includes the circular cylindrical portion 288 to which the motor shaft 222 is fixed.

As illustrated in FIG. 19, the other end portion 326 of each of the first magnetism guide members 296 projects out from the placement body 278 towards the circuit substrate 216 side. The end face of the other end portion 326 of the first magnetism guide member 296 accordingly faces towards and is in close to the magnetism detection sensor 294. The one end portion 324 of each of the first magnetism guide members 296 projects out from the placement body 278 (the retaining portion 322) towards the motor section 212 side. The one end portion 324 of the first magnetism guide member 296 is accordingly in close to the rotor magnet 256 of the motor section 212.

Explanation follows regarding the operation and advantageous effects of an example of a motor according to the fifth exemplary embodiment of the present invention.

In the motor 210 according to the fifth exemplary embodiment of the present invention, as illustrated in FIG. 18, the one end portion 324 of the first magnetism guide member 296 configuring each of the magnetism detection sections 292 is disposed in the slot 300 between the teeth section 240 formed with the forward winding section 244 and the teeth section 242 formed with the reverse winding section 246 of the same phase as this forward winding section 244. The magnetic flux generating (emanating) from the forward winding section 244 and the magnetic flux generating (emanating) from the reverse winding section 246 therefore cancel each other out at the position of the one end portion 324 of the first magnetism guide member 296. The magnetism generating (emanating) from the rotor magnet 256 can accordingly be detected with good precision by the magnetism detection section 292, enabling the rotational position of the rotor section 220 also to be detected with good precision.

More specifically, when the motor 210 is being driven, for the both of the forward winding section 244 and the reverse winding section 246 which are of the same phase, either current flowing at the same time, or current not flowing at the same time. That is to say, current flowing only in one of the forward winding section 244 or the reverse winding section 246 which is of the same phase of the forward winding section 244 does not occur. Hence, when at the same time current is not flowing through both the forward winding section 244 and the reverse winding section 246 which are of the same phase, each of the magnetism detection sections 292 is not influenced by magnetic flux emanating from the forward winding section 244 and the reverse winding section 246, enabling the magnetism emanating from the rotor magnet 256 to be detected with good precision. Moreover, when at the same time current is flowing through both the forward winding section 244 and the reverse winding section 246 which are of the same phase, the magnetic flux emanating from the forward winding section 244 and the magnetic flux emanating from the reverse winding section 246 cancel each other out at the position of the one end portion 324 of the first magnetism guide member 296, and so the magnetism emanating from the rotor magnet 256 can be detected with good precision by the magnetism detection sections 292.

The one end portion 324 of the first magnetism guide member 296 is disposed on the line bisecting the open angle at the slot 300. That is to say the one end portion 324 of the first magnetism guide member 296 is disposed exactly in the middle between the forward winding section 244 and the reverse winding section 246, and due to the magnetic flux emanating from the forward winding section 244 and the magnetic flux emanating from the reverse winding section 246 cancelling each other out, the magnetic flux emanating from the forward winding section 244 and the reverse winding section 246 is made even smaller at the position of the one end portion 324 of the first magnetism guide member 296. The magnetism emanating from the rotor magnet 256 can accordingly be detected with even better precision by the magnetism detection section 292.

Moreover, as illustrated in FIG. 19, by splitting each of the magnetism detection sections 292 into the magnetism detection sensor 294 and the first magnetism guide member 296 (the magnetism detection section 292 is configured by the two independent members), the magnetism detection sensors 294 can be disposed separated from the motor section 212, and the degrees of freedom for positioning the magnetism detection sensor 294 can be raised.

Moreover, as illustrated in FIG. 20, by positioning a portion (the region 312) of the one end portion 324 of the first magnetism guide member 296 further to the radial direction outside (the rotor magnet 256 side) of the stator section 218 than the imaginary line 310 where there is no influence from the magnetic flux emanating from the forward winding section 244 and the reverse winding section 246, the magnetism emanating from the rotor magnet 256 can be detected with even better precision by the magnetism detection section 292.

Moreover, since the edge portions 308 of the leading end outside faces 302 of the teeth sections 240 and 242 are positioned further to the stator core 226 radial direction inside than an outer peripheral face 328 of the stator core 226 with the radius of the central portions 306 of the leading end outside faces 302 of the teeth sections 240 and 242, the imaginary line 310 can be disposed further to the stator core 226 radial direction inside than the outer peripheral face 328 of the stator core 226. Hence the portion of the first magnetism guide member 296 (the surface area of the region 312) positioned further to the stator section 218 radial direction outside (the rotor magnet 256 side) than the imaginary line 310 can be made greater than that in a case in which the leading end outside face edge portions 308 of the teeth sections 240 and 242 are disposed at the same position as the outer peripheral face 328 of the stator core 226. The one end portion 324 of the first magnetism guide member 296 can also be disposed even further location in the stator core 226 radial direction inside so that the one end portion 324 of the first magnetism guide member 296 does not make contact with the rotating rotor magnet 256. This effect is particularly effective in a case in which there is a small gap between the outer peripheral face 328 of the stator core 226 and a path (locus) 330 of the inner peripheral face of the rotor magnet 256.

Moreover, as illustrated in FIG. 19, the retaining portions 322 for retaining the first magnetism guide members 296 are integrally formed to the placement body 278, so the first magnetism guide members 296 can be retained without increasing the number of components configuring the motor 210. The retaining portions 322 are integrally formed to the placement body 278 that mounts the circuit substrate 216 with good positional precision, enabling the end faces of the other end portion 326 of the first magnetism guide member 296 to be reliably faced towards the magnetism detection sensor 294.

In addition to the first magnetism guide member 296 disposed between the motor section 212 and the magnetism detection sensor 294 and serving as a magnetism guide member that guides magnetism emanating from the rotor magnet 256 towards the magnetism detection sensor 294, the second magnetism guide member 298 is also provided disposed on opposite side of the magnetism detection sensor 294 to the first magnetism guide member 296 side. The magnetism guided to the magnetism detection sensor 294 can thereby be increased, enabling the magnetism emanating from the rotor magnet 256 to be detected with good precision even in a case in which the magnetism detection sensor 294 is disposed with some separation from the motor section 212.

As illustrated in FIG. 19, the second magnetism guide member 298 is disposed such that the magnetism detection sensor 294 is interposed between the second magnetism guide member 298 and the first magnetism guide member 296. That is to say the first magnetism guide member 296 and the second magnetism guide member 298 are disposed such that the magnetism emanating from the rotor magnet 256 passes through from one face side of the magnetism detection sensor 294 to the opposite face side of the magnetism detection sensor 294. The magnetism guided to the magnetism detection sensor 294 can accordingly be increased even further.

Moreover, as illustrated in FIG. 19, the first magnetism guide member 296 and the second magnetism guide member 298 are formed in bar shapes, and disposed along the same straight line along the axial direction X. The magnetism emanating from the rotor magnet 256 can thereby be efficiently guided to the magnetism detection sensor 294.

Moreover, as illustrated in FIG. 19, the three retaining portions 322 are integrally formed to the placement body 278 that includes the circular cylindrical portion 288 to which the motor shaft 222 is fixed. The three first magnetism guide members 296 are accordingly disposed with good positional precision with reference to the motor shaft 222 of the motor section 212, enabling the one end portion 324 of the first magnetism guide member 296 to also be disposed with good precision at a position in close to the rotor magnet 256. The enables the magnetism emanating from the rotor magnet 256 to be efficiently guided to the magnetism detection sensor 294.

An example of a motor according to the fifth exemplary embodiment of the present invention has been explained above.

Note that in the present exemplary embodiment, as illustrated in FIG. 17, an example is given of an outer rotor type motor 210 in which the stator section 218 is disposed at the rotor section 220 radial direction inside and facing the rotor magnets 256. However, the present exemplary embodiment may be applied to an inner rotor type motor in which the stator section is disposed at a rotor section radial direction outside and facing the rotor magnets.

Moreover, as illustrated in FIG. 20, the present exemplary embodiment illustrates an example in which the one end portion 324 of the first magnetism guide member 296 is disposed on a line bisecting the opening angle of the slot 300 formed between the teeth section 240 and the teeth section 242. However, the one end portion 324 of the first magnetism guide member 296 may be disposed in the slot 300 formed between the teeth section 240 and the teeth section 242 or may be disposed further to the rotor magnet 256 side than the slot 300. Namely, all of the one end portions 324 of the first magnetism guide members 296 may be disposed in the slots 300 formed between the teeth sections 240 and the teeth sections 242, all of the one end portions 324 may be disposed further to the rotor magnet 256 side than the slots 300, or the one end portions 324 may be disposed so as to be across both the slots 300 and regions further to the rotor magnet 256 side than the slots 300.

Moreover, in the present exemplary embodiment, as illustrated in FIG. 20, an example of placement of the one end portion 324 of the 296 is shown in which a portion (the region 312) of the one end portion 324 of the first magnetism guide member 296 is disposed further to the stator section 218 radial direction outside (the rotor magnet 256 side) than the imaginary line 310. However, configuration may be made in which at least a portion of the one end portion 324 of the first magnetism guide member 296 is positioned further to the stator section 218 radial direction outside (the rotor magnet 256 side) than the imaginary line 310. Preferably the one end portion 324 of the first magnetism guide member 296 is disposed such that the surface area of the region 312 in which it is not influenced by magnetism emanating from the forward winding section 244 and the reverse winding section 246 is larger than the surface area of a region 314 that is influence by the magnetic flux emanating from the forward winding section 244 and the reverse winding section 246. More preferably the one end portion 324 of the first magnetism guide member 296 is disposed such that only the region 312 is present (such that all of the one end portion 324 of the first magnetism guide member 296 is positioned further to the stator section 218 radial direction outside (the rotor magnet 256 side) than the imaginary line 310).

In the present exemplary embodiment, as illustrated in FIG. 17, an example is given in which the second magnetism guide member 298 is retained by the cover body 282, however the second magnetism guide member 298 may be retained by another member. For example, a retaining member may be provided to the placement body 278 to extend out towards the second magnetism guide member 298, such that the second magnetism guide member 298 is retained by the retaining member.

In the present exemplary embodiment, as illustrated in FIG. 17, configuration is made such that the magnetism detection sensor 294 is mounted to the circuit substrate 216 on the motor section 212 side, however the magnetism detection sensor 294 may be mounted to the circuit substrate 216 on the cover body 282 side.

Moreover, in the present exemplary embodiment, an example is given in which three of the magnetism detection sections 292 are mounted to the motor section 212 side of the circuit substrate 216. However, a number other than three of the magnetism detection sections 292 may be mounted to motor section 212 side of the stator 16, and the magnetism detection sections 292 may be disposed in any of the slots 300 each of which is between the teeth section 240 formed with the forward winding section 244 and the teeth section 242 formed with the reverse winding section 246 that is of the same phase as that of the given forward winding section 244.

Sixth Exemplary Embodiment

Explanation Follows Regarding an Example of a Sixth Exemplary Embodiment of a Motor According to the Present Invention, with Reference to the Drawings.

Note that in the following explanation, explanation may be omitted with respect to parts and members similar to those in the fifth exemplary embodiment of the present invention.

For example, a motor section 412, described later, corresponds to a motor section 212 of the fifth exemplary embodiment, and so explanation thereof may be omitted.

Figure 22:
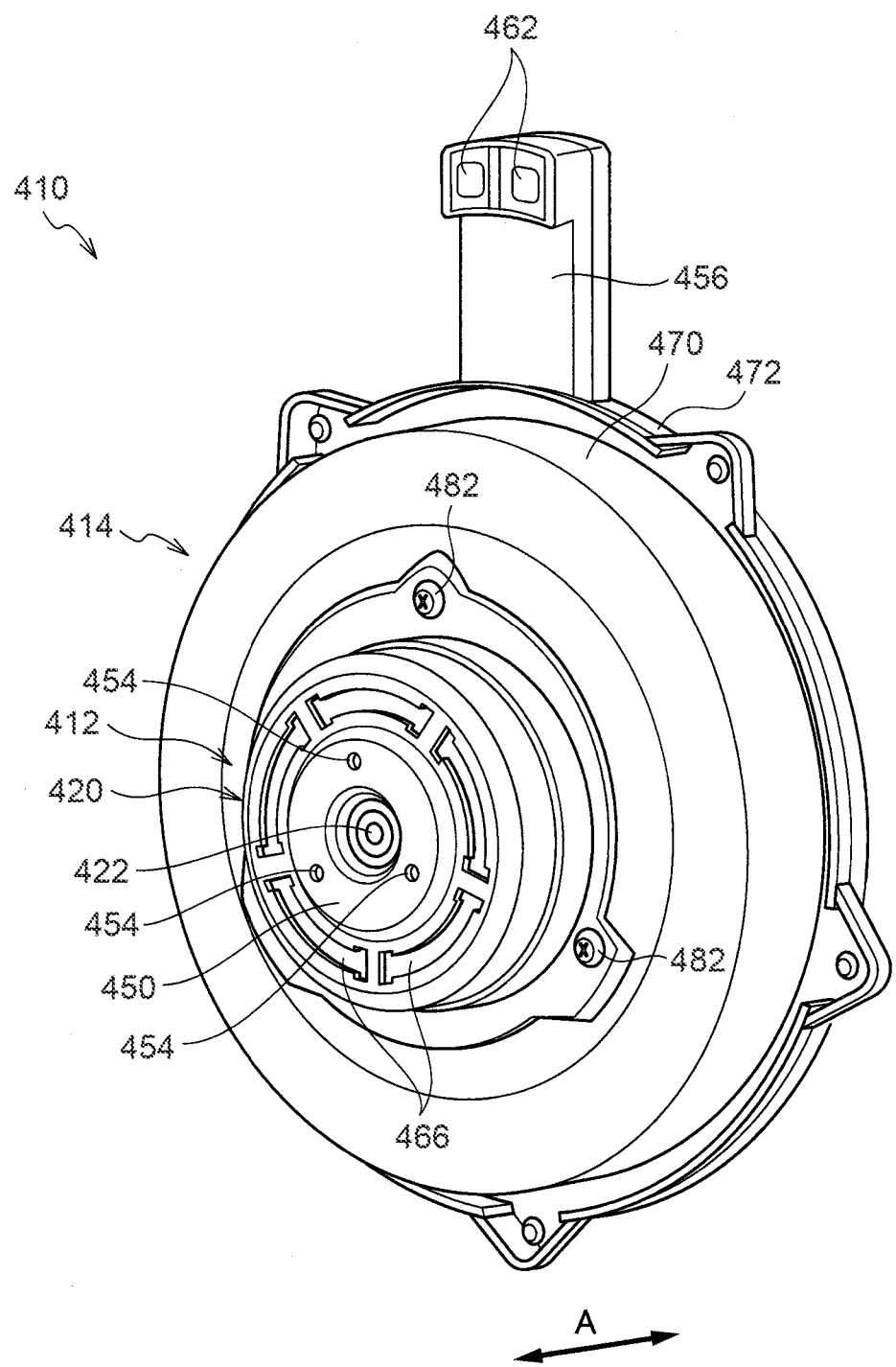
FIG. 22 is a perspective view illustrating an external view of a motor according to a sixth exemplary embodiment of the present invention.
Figure 23:
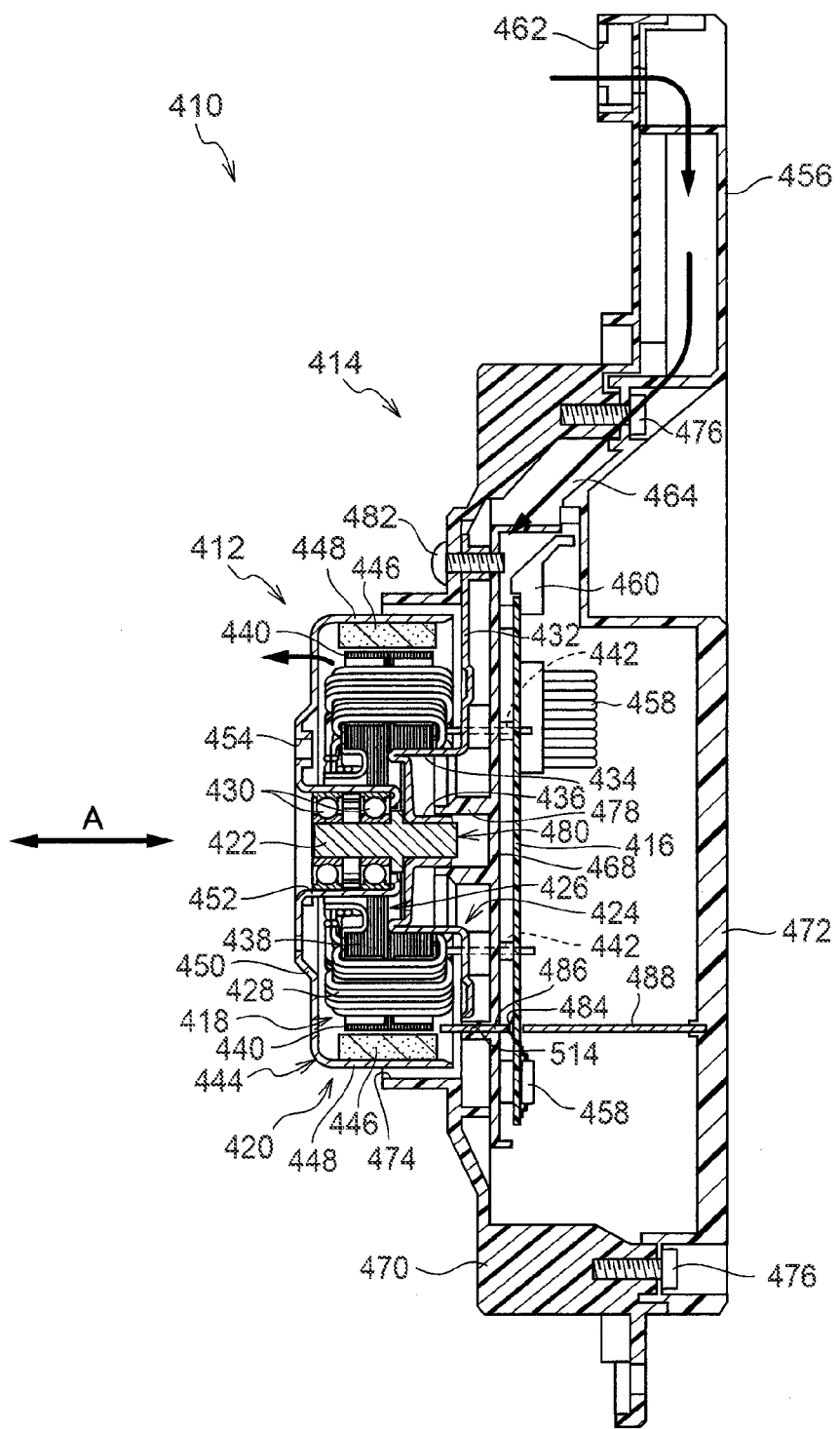
FIG. 23 is a cross-section of a motor according to the sixth exemplary embodiment of the present invention.

FIG. 22 is a perspective view illustrating the external appearance of a motor 410 according to a sixth exemplary embodiment of the present invention. FIG. 23 is a cross-section of the motor 410 according to the sixth exemplary embodiment of the present invention. The motor 410 is, for example, employed as a blower motor used to blow air inside a vehicle installed in a vehicle such as a passenger vehicle, or employed as a fan motor for cooling a radiator installed in a vehicle such as a passenger vehicle. The present exemplary embodiment is an example of a blower motor.

The motor section 412 is configured including a stator section 418 and a rotor section 420. The stator section 418 includes a motor shaft 422, a stator housing 424, a stator core 426, and coils 428. The motor shaft 422 is disposed along the motor 410 axial direction (arrow A direction in FIG. 23).

The stator core 426 is configured including a ring shaped ring section 438, and teeth sections 440 formed at the outer peripheral side of the ring section 438. The inner peripheral face of the ring section 438 is fixed to the outer peripheral face of a recessed section 434 of the stator housing 424. The teeth sections 440 include coils (winding wires) 428 formed by winding copper wire. Terminal ends of the coils 428 (referred to below as coil terminal ends 442) lead out towards a circuit substrate 416, and are connected to connection holes 494, described later, formed in the circuit substrate 416.

A rotary magnet 446 is disposed facing towards the teeth sections 440.

The motor section 412 is externally exposed through an exposure hole 474 formed in a bottom section of a case body 470.

The placement body 468 mounts thereat the circuit substrate 416 with good positioning precision. The placement body 468 includes a circular cylindrical portion 478 formed projecting out towards the motor section 412 side. The circular cylindrical portion 478 is formed so as to be insertable with a shaft portion 480 of the motor section 412 (a motor shaft 422 in a state with a cylindrical shaped portion 436 of the stator housing 424 is provided at the external peripheral portion thereof). The placement body 468 is attached to the motor section 412 in a state in which the shaft portion 480 of the motor section 412 is inserted into the circular cylindrical portion 478. The circular cylindrical portion 478 has the function of positioning the axis 480 of the motor section 412. Note that the placement body 468 and the motor section 412 are fixed together by fixing screws 482.

Magnetism detection sensors 484 configured for example by Hall devices are mounted on the motor section 412 side of the circuit substrate 416. The magnetism detection sensor 484 is used to detect the rotation position of a rotor section 420 with respect to the stator section 418 by detecting magnetism generating (emanating) from the rotary magnet 446 of the motor section 412.

The magnetism detection sensors 484 are disposed at positions separated from the motor section 412. First magnetism guide members 486 for guiding the magnetism emanating from the rotary magnet 446 towards the magnetism detection sensors 484 are accordingly disposed between the motor section 412 and the magnetism detection sensors 484. Second magnetism guide members 488 are also disposed on the opposite side of the magnetism detection sensors 484 to the sides of the first magnetism guide member 486, such that the magnetism detection sensors 484 are sandwiched between the first magnetism guide members 486 and the second magnetism guide members 488.

The first magnetism guide members 486 and the second magnetism guide members 488 are configured for example by ferromagnetic bodies such as iron members, are formed in bar shapes orientated with their length directions along the axial direction of the motor section 412, and the first magnetism guide member 486 and the second magnetism guide member 488 are disposed along the same straight line as each other. The first magnetism guide members 486 are retained by the placement body 468, and the second magnetism guide members 488 are retained by a cover body 472.

Figure 24:
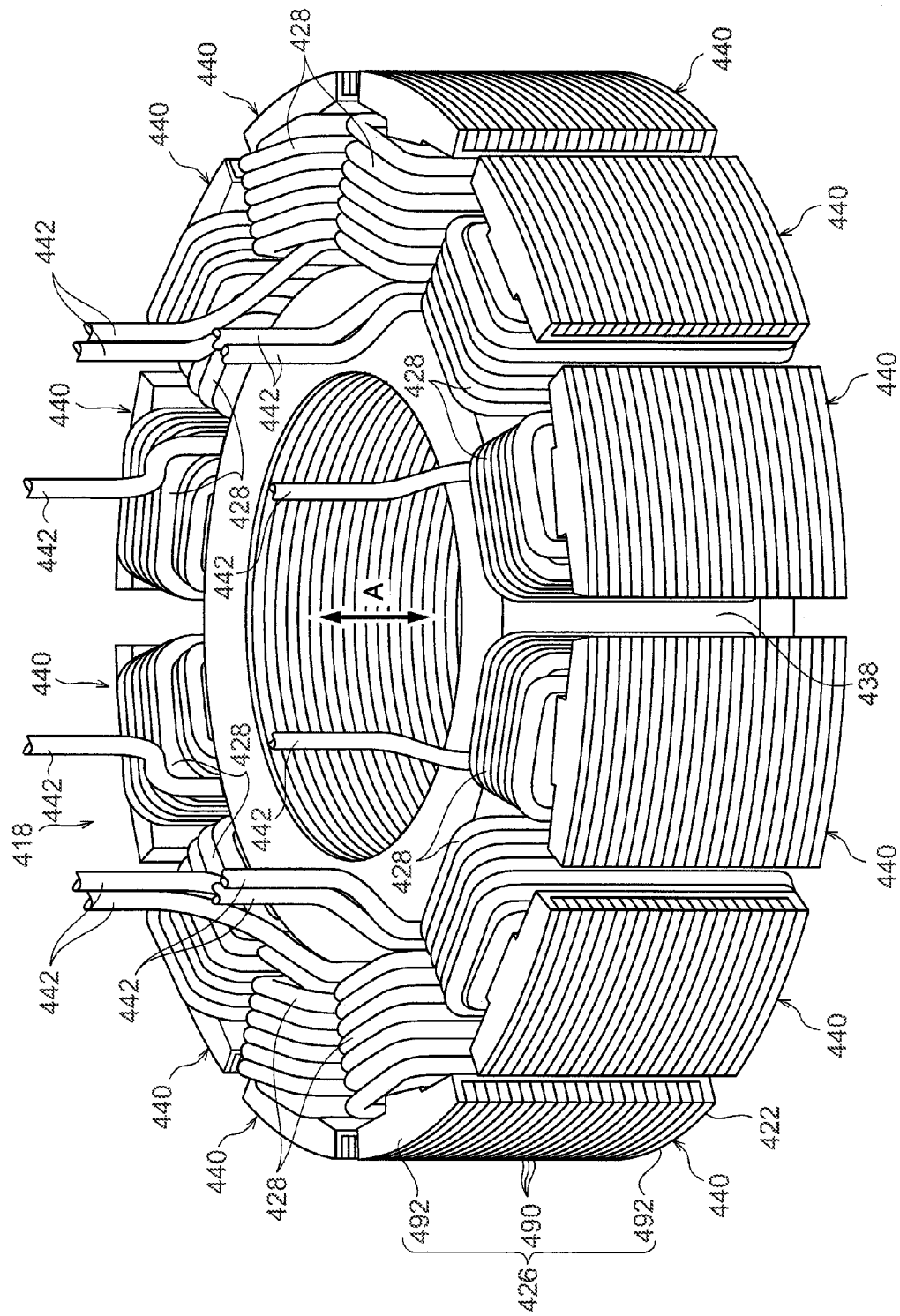
FIG. 24 is a perspective view illustrating a stator section of a motor according to the sixth exemplary embodiment of the present invention.

FIG. 24 is a perspective view illustrating the stator section 418. Note that for ease of explanation the stator housing 424 is not illustrated.

As described above, the stator core 426 includes the ring section 438 and the teeth sections 440 formed at the outer peripheral side of the ring section 438. Specifically, there are 12 individual teeth sections 440 formed extending radially out from the ring section 438. The coils 428 are formed respectively to the 12 individual teeth sections 440, and the 12 coil terminal ends 442 lead out towards the circuit substrate 416 (see FIG. 23).

Figure 25:
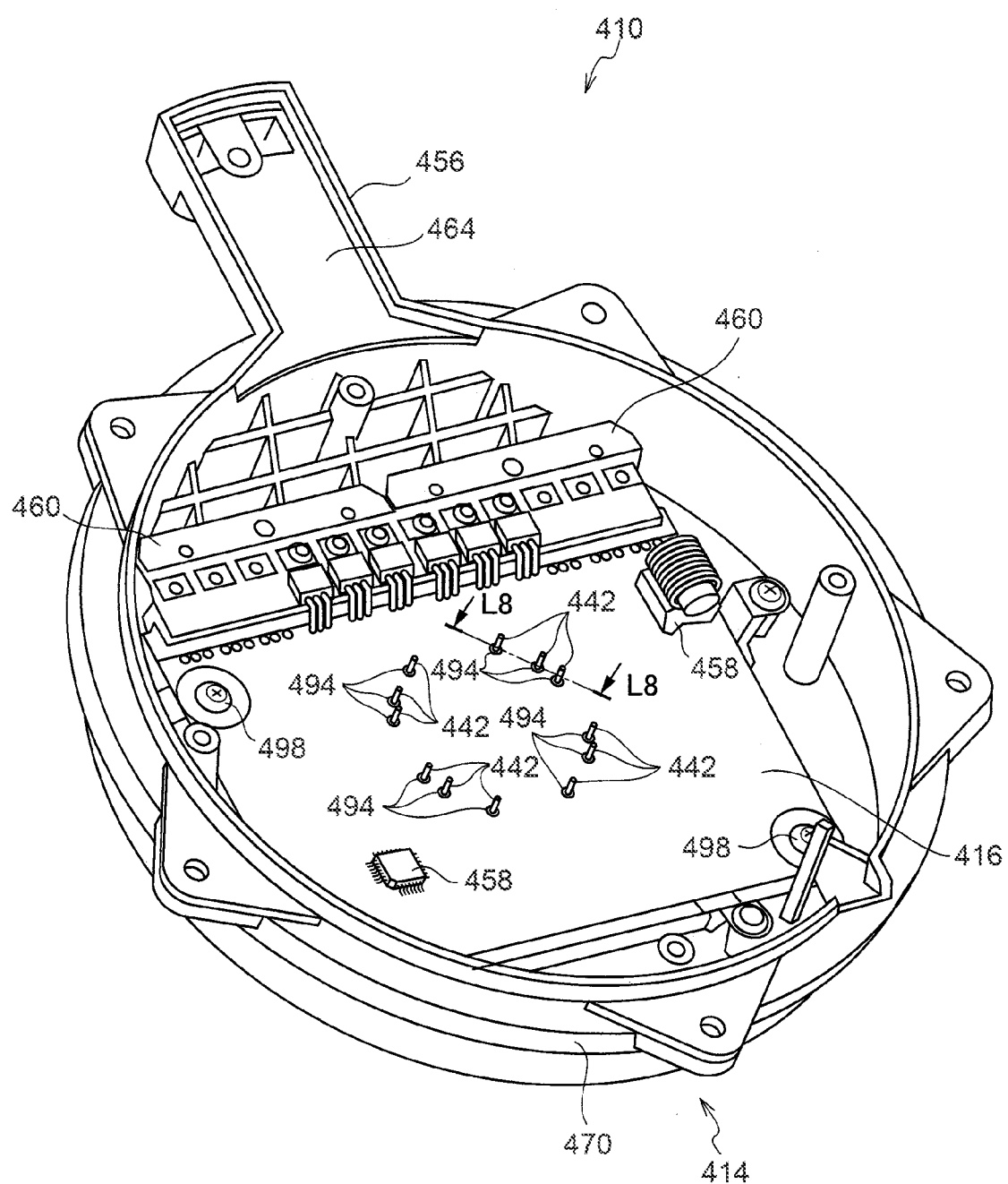
FIG. 25 is a perspective view illustrating a motor according to the sixth exemplary embodiment as viewed from a housing section side in a state in which a cover body has been removed.

FIG. 25 is a perspective view illustrating the motor 410 as viewed from a housing section 414 side in a state with the cover body 472 removed.

As illustrated in FIG. 25, the 12 coil terminal ends 442 that lead towards the circuit substrate 416 are inserted into 12 individual connection holes 494 formed at specific positions in the circuit substrate 416. Note that the 12 coil terminal ends 442 are respectively electrically connected to the circuit substrate 416 by soldering in a state inserted through the corresponding connection holes 494.

Figure 26:
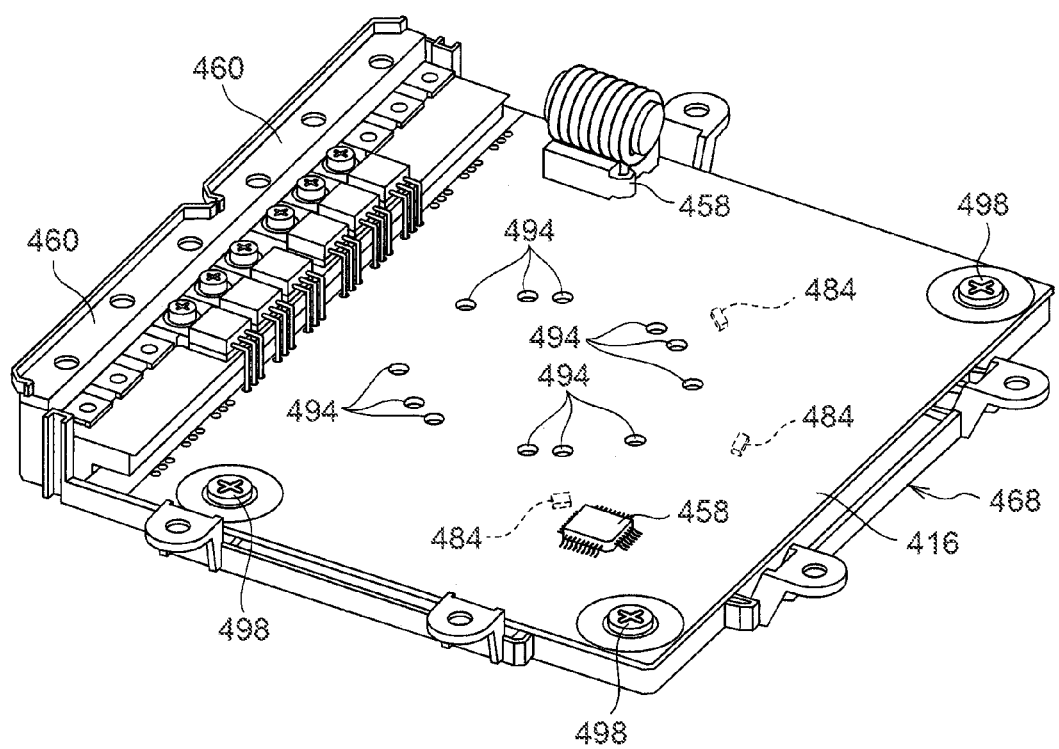
FIG. 26 is a perspective view illustrating a motor according to the sixth exemplary embodiment of the present invention in a state in which a circuit substrate has been placed on a placement body.
Figure 27:
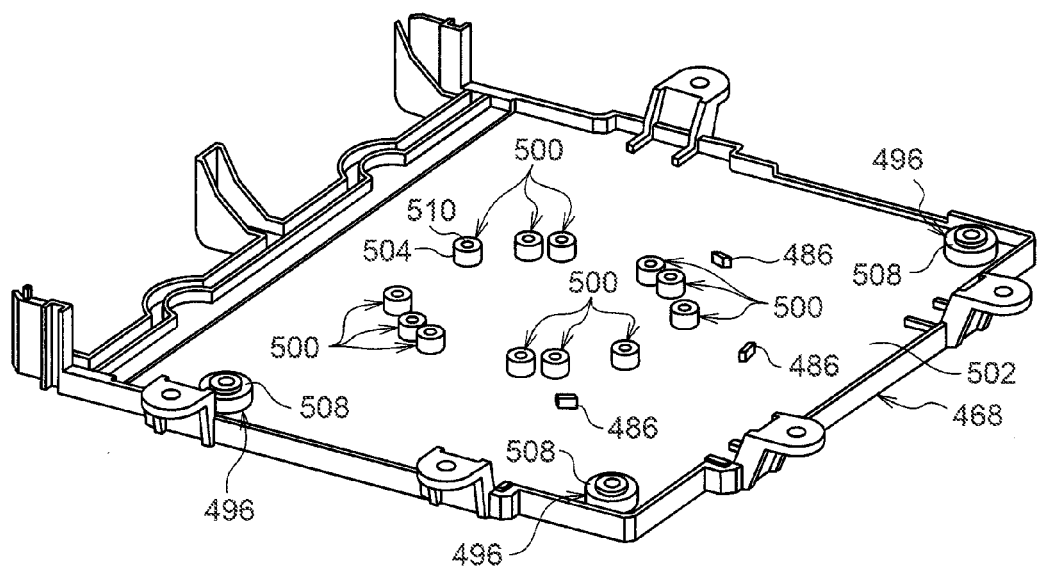
FIG. 27 is a perspective view illustrating a placement body of a motor according to the sixth exemplary embodiment of the present invention showing, the side on which a circuit substrate is placed.
Figure 28:
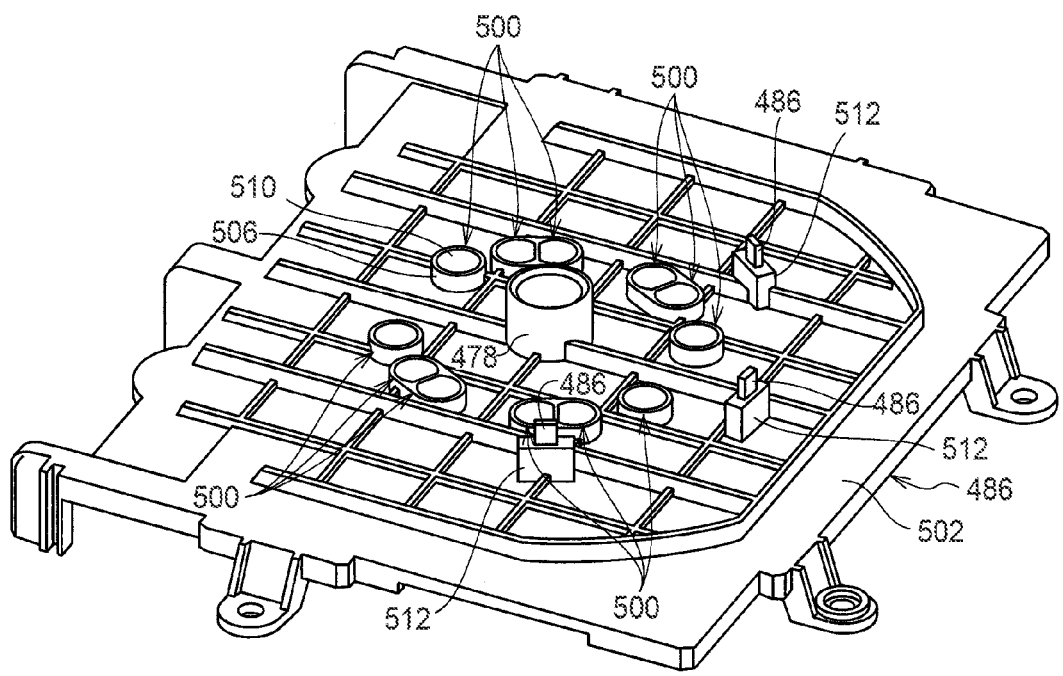
FIG. 28 is a perspective view illustrating a placement body of a motor according to the sixth exemplary embodiment of the present invention, showing the opposite side to the side on which a circuit substrate is placed.
Figure 29:
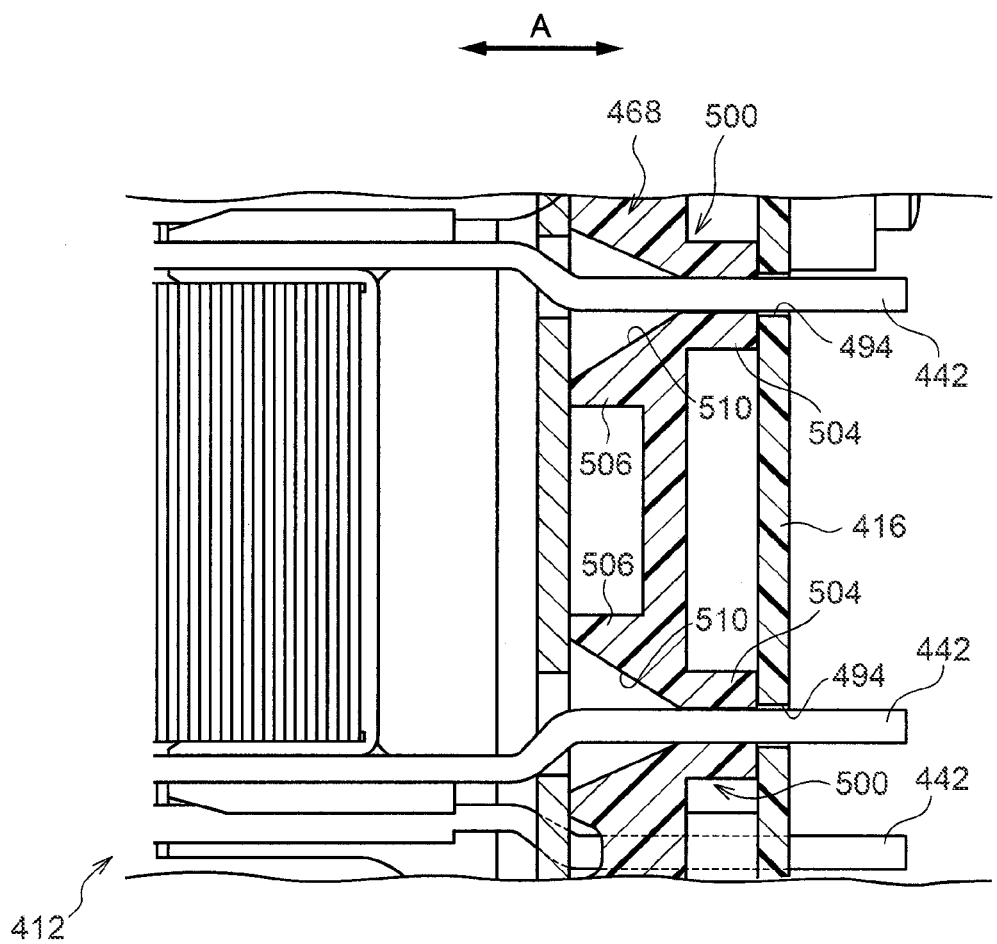
FIG. 29 is a cross-section taken along line L8-L8 of FIG. 25.

FIG. 26 is a perspective view illustrating a state in which the circuit substrate 416 is mounted on the placement body 468. FIG. 27 is a perspective view illustrating the placement body 468 from the side to which the circuit substrate 416 is mounted. FIG. 28 is a perspective view illustrating the placement body 468 from the opposite side to the circuit substrate 416 mounting side. FIG. 29 is a cross-section taken along line L8-L8 in FIG. 25.

As illustrated in FIG. 26 and FIG. 27, the circuit substrate 416 is fixed to the placement body 468 by fixing screws 498 in a state positioned with good positional precision with respect to the placement body 468 by three individual positioning bosses 496 formed in the vicinity of corner portions of the placement body 468. Three of the individual magnetism detection sensors 484 are mounted to the circuit substrate 416.

As illustrated in FIG. 27 and FIG. 28, 12 individual guide portions 500 are integrally formed to the placement body 468. Each of the guide portions 500 are used to guide each of the coil terminal ends 442 to the corresponding connection hole 494 when the placement body 468 is being attached to the motor section 412. Each of the guide portions 500 includes a projection portion 504 projecting out, with respect to a flat plate section 502 of the placement body 468, at the side of the placement body 468 on which side the circuit substrate 416 is mounted, and a projection portion 506 projecting out, with respect to the flat plate section 502 of the placement body 468, at the opposite side of the placement body 468 to the circuit substrate 416 mounted side. Note that the height of each of the projection portions 504 is set to be the same height as a mounting face 508 of three positioning bosses 496 for mounting the circuit substrate 416. Note that the height of each of the projection portions 506 is set to be lower than height of the cylindrical shaped portion 436.

As illustrated in FIG. 27 to FIG. 29, insertion holes 510 are formed in each of the guide portions 500, passing through the placement body 468 and insertable through by the coil terminal ends 442. Due to the circuit substrate 416 being positioned with good precision with respect to the placement body 468, the 12 individual insertion holes 510 and the 12 individual connection holes 494 are positioned to correspond to each other with good positional precision. Each of the insertion holes 510 is formed along the direction of attachment of the placement body 468 to the motor section 412 (the same direction as the axial direction of the motor 410 (the direction illustrated by arrow A in the drawings). The internal diameter of each of the insertion holes 510 is set such that a larger diameter on the motor section 412 side and a smaller diameter on the circuit substrate 416 side. Namely, each of the insertion holes 510 is formed with a tapered shape that narrows in diameter from the motor section 412 side towards the connection holes 494 on the circuit substrate 416 side. Each of the coil terminal ends 442 is accordingly guided towards the corresponding connection hole 494 when the placement body 468 is being attached to the motor section 412.

As illustrated in FIG. 28, circular cylindrical portion 478 is integrally formed on the opposite side of the placement body 468 to the side of mounting the circuit substrate 416. The circular cylindrical portion 478 projects out in the direction of attachment of the placement body 468 to the motor section 412. Moreover, the coil terminal ends 442 lead out from the motor section 412 so as to be inserted through the insertion holes 510 when the placement body 468 is being attached to the motor section 412 (see FIG. 24). Accordingly, when the placement body 468 is being attached to the motor section 412, the coil terminal ends 442 are readily inserted through the insertion holes 510 by rotationally adjusting the placement body 468 with respect to the motor section 412 with the shaft portion 480 of the motor section 412 in an inserted state in the circular cylindrical portion 478. The coil terminal ends 442 that have been inserted through the insertion holes 510 are guided towards the connection holes 494 of the circuit substrate 416 by the guide portions 500.

Moreover, as illustrated in FIG. 28, three individual retaining portions 512 are integrally formed to the placement body 468. A press-fit hole 514 for press-fitting the first magnetism guide member 486 is formed in each of the retaining portions 512 (see FIG. 23 and FIG. 30). The three individual first magnetism guide members 486 are retained by press-fitting into the respective press-fit holes 514. The three individual retaining portions 512 are integrally formed to the placement body 468, and the circuit substrate 416 to which the three individual magnetism detection sensors 484 are mounted being positioned with good precision with respect to the placement body 468, therefore the three individual magnetism detection sensors 484 and the three individual first magnetism guide members 486 are correspond to each other with good positional precision. The three individual retaining portions 512 are formed with reference to the circular cylindrical portion 478. A configuration is accordingly achieved in which the three individual first magnetism guide members 486 are disposed, with reference to the shaft portion 480 of the motor section 412, with good positional precision in the radial direction with respect to the motor section 412.

As illustrated in FIG. 27, one end of each of the first magnetism guide members 486 is exposed from the side of the placement body 468 to which side the circuit substrate 416 is mounted. The one ends of the first magnetism guide members 486 are accordingly in close to the magnetism detection sensors 484 (see FIG. 23 and FIG. 30). Moreover, as illustrated in FIG. 28, the other end of each of the first magnetism guide members 486 projects out towards the opposite side of the placement body 468 to the circuit substrate 416 mounting side, this side being the motor section 412 side. The other ends of the first magnetism guide members 486 are accordingly in close to the rotary magnet 446 of the motor section 412 (see FIG. 23 and FIG. 30).

Figure 30:
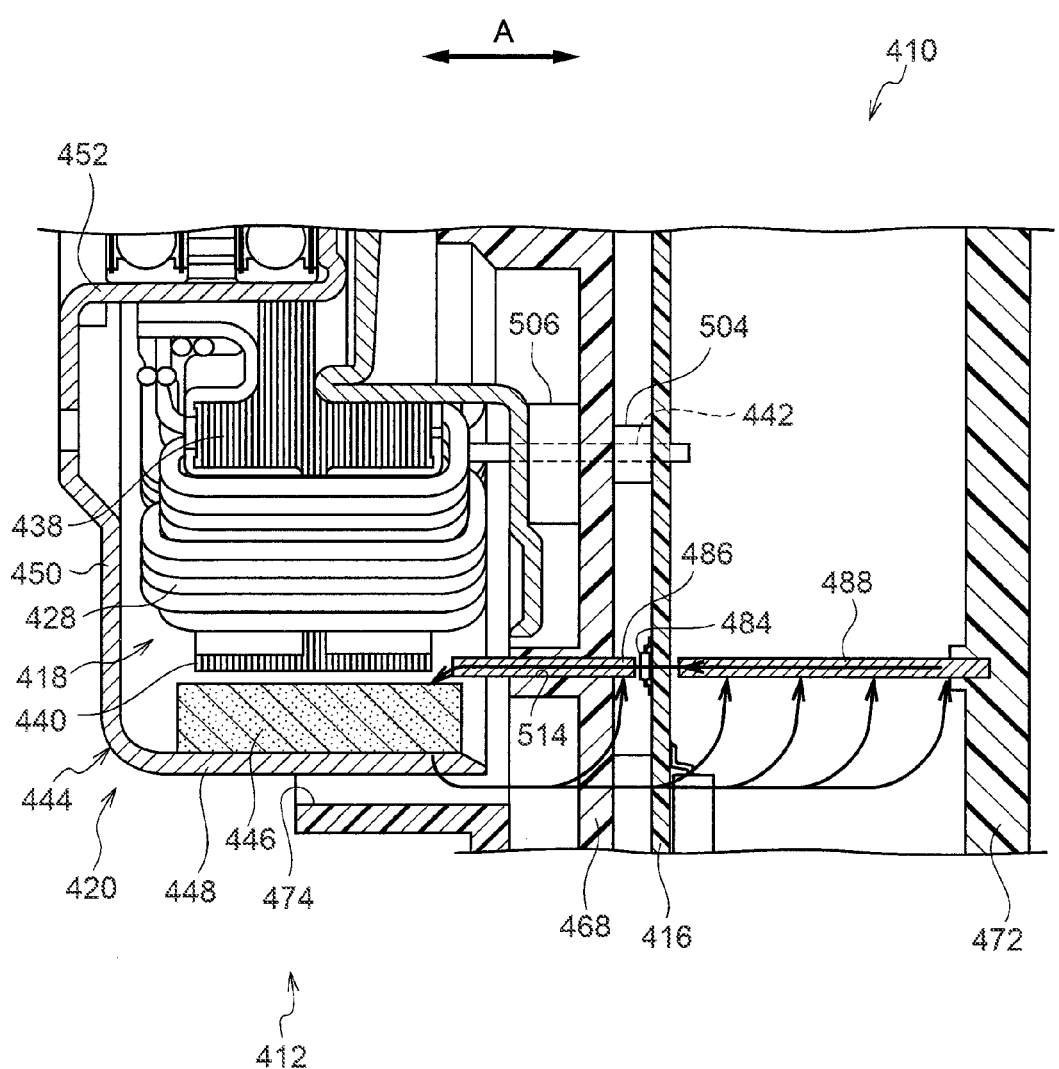
FIG. 30 is a drawing of a motor according to the sixth exemplary embodiment of the present invention illustrating a state in which magnetism emanating from a rotor magnet is guided towards a magnetism detection sensor.
Figure 31:
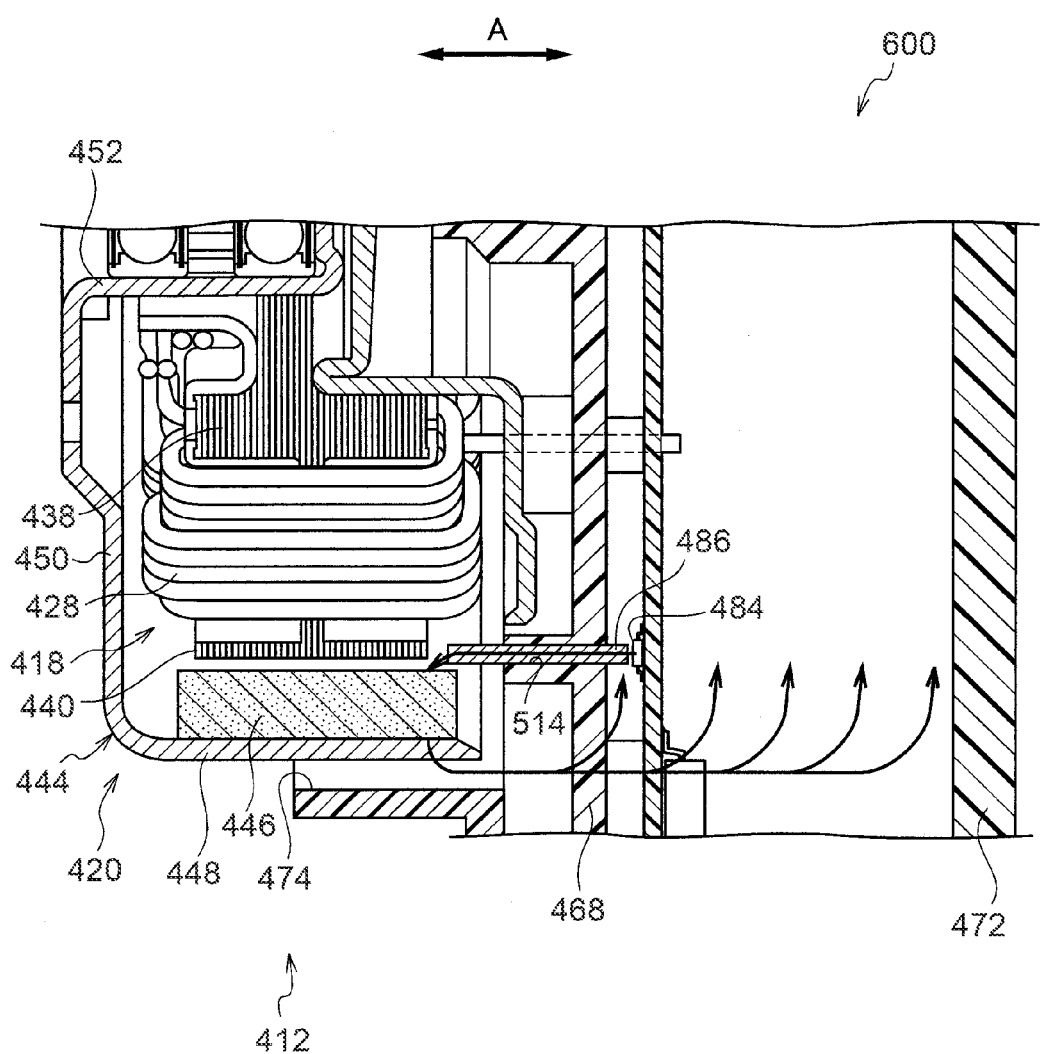
FIG. 31 is a drawing of a motor of a comparative example to a motor to the sixth exemplary embodiment of the present invention, illustrating a state in which magnetism emanating from a rotor magnet is guided towards a magnetism detection sensor.

FIG. 30 illustrates the motor 410 according to the sixth exemplary embodiment of the present invention showing a manner in which the magnetism emanating from the rotary magnet 446 is guided towards each of the magnetism detection sensors 484. FIG. 31 illustrates a motor 600, serving as a comparative example to the motor 410 of the sixth exemplary embodiment of the present invention, showing a manner in which magnetism emanating from a rotary magnet 446 is guided towards a magnetism detection sensor 484.

The motor 410 according to the sixth exemplary embodiment of the present invention, as illustrated in FIG. 30, as magnetism guide member that guides the magnetism emanating from the rotary magnet 446 towards the magnetism detection sensor 484, is equipped with the first magnetism guide member 486, disposed between the motor section 412 and the magnetism detection sensor 484, and with the second magnetism guide member 488 disposed on the opposite side with respect to the magnetism detection sensor 484 to the first magnetism guide member 486 side. The second magnetism guide member 488 is disposed such that the magnetism detection sensor 484 is sandwiched between the first magnetism guide member 486 and the second magnetism guide member 488. The magnetism on the motor section 412 side with respect to the magnetism detection sensor 484 is accordingly guided towards the magnetism detection sensor 484 by the first magnetism guide member 486, and the magnetism on the opposite side with respect to the magnetism detection sensor 484 to the motor section 412 side is guided towards the magnetism detection sensor 484 by the second magnetism guide member 488.

In contrast thereto, the motor 600 of the comparative example, as illustrated in FIG. 31, is only equipped with the first magnetism guide member 486 interposed between the motor section 412 and the magnetism detection sensor 484 for guiding the magnetism emanating from the rotary magnet 446 to the magnetism detection sensor 484 as the magnetism guide member. Consequently, although the magnetism on the motor section 412 side with respect to the magnetism detection sensors 484 is guided towards the magnetism detection sensor 484 by the first magnetism guide member 486, the magnetism on the opposite side with respect to the magnetism detection sensor 484 to the motor section 412 side is not guided towards the magnetism detection sensor 484.

Operation and Advantageous Effects

The motor 410 according to the sixth exemplary embodiment of the present invention includes the placement body 468 that is attached to the motor section 412, mounting the circuit substrate 416. The guide portions 500 for guiding the coil terminal ends 442 to the connection holes 494 of the circuit substrate 416 are integrally formed to the placement body 468. There is consequently no increase in the names of components configuring the motor 410, the coil terminal ends 442 leading out from the motor section 412 can be guided to the connection holes 494 of the circuit substrate 416 when assembling the motor section 412 and the circuit substrate 416 together. The guide portions 500 are integrally formed to the placement body 468 to which the circuit substrate 416 is mounted with good positional precision. The coil terminal ends 442 leading out from the motor section 412 can accordingly be guided with good positional precision to the connection holes 494 of the circuit substrate 416 when the motor section 412 is being assembled to the circuit substrate 416.

The guide portions 500 also have the insertion holes 510 that are insertable with the coil terminal ends 442, and the insertion holes 510 are formed at positions corresponding to the connection holes 494 along the direction of attachment of the placement body 468 to the motor section 412, and narrowing in diameter towards the connection holes 494. Consequently, the coil terminal ends 442 that lead out from the motor section 412 can be reliably guided to the connection holes 494 of the circuit substrate 416 when the motor section 412 and the circuit substrate 416 are being assembled together, whilst using a simple structure.

The coil terminal ends 442 lead out from the motor section 412 so as to be inserted into the insertion holes 510 when the placement body 468 is being attached to the motor section 412. Consequently, the coil terminal ends 442 leading out from the motor section 412 can be readily guided to the connection holes 494 of the circuit substrate 416 when the motor section 412 and the circuit substrate 416 are being assembled together.

The placement body 468 includes the circular cylindrical portion 478 that projects out along the direction of attachment of the placement body 468 to the motor section 412 and in which is insertable the shaft portion 480 of the motor section 412. Consequently, when the placement body 468 is being attached to the motor section 412, the coil terminal ends 442 can be readily inserted into the insertion holes 510 by rotationally adjusting the placement body 468 with respect to the motor section 412 with the shaft portion 480 in an inserted state into the circular cylindrical portion 478. The coil terminal ends 442 leading out from the motor section 412 can accordingly be readily guided to the connection holes 494 of the circuit substrate 416.

Moreover, the retaining portions 512, for retaining the first magnetism guide members 486 that guide magnetism emanating from the rotary magnet 446 of the motor section 412 to the magnetism detection sensors 484 mounted to the circuit substrate 416, are also integrally formed to the placement body 468. The first magnetism guide members 486 can thereby be retained without increasing the numbers of components configuring the motor 410. Moreover, the retaining portions 512 are integrally formed to the placement body 468 that mounts thereat the circuit substrate 416 with good positional precision, and hence the first magnetism guide members 486 can be retained with good positional precision with respect to the magnetism detection sensors 484.

Moreover, in the motor 410 of the sixth exemplary embodiment of the present invention, as magnetism guide members for guiding magnetism emanating from the rotary magnet 446 to the magnetism detection sensors 484, in addition to the first magnetism guide members 486 interposed between the motor section 412 and the magnetism detection sensors 484, the second magnetism guide members 488 are also provided on the opposite side with respect to the magnetism detection sensors 484 to the first magnetism guide members 486 side. The magnetism guided to the magnetism detection sensors 484 can accordingly be increased, and the magnetism emanating from the rotary magnet 446 can be detected with good precision even in case where the magnetism detection sensors 484 are disposed separated away from the motor section 412.

Moreover, the second magnetism guide members 488 are disposed such that the magnetism detection sensors 484 are interposed between the first magnetism guide members 486 and the second magnetism guide members 488. Namely, the first magnetism guide member 486 and the second magnetism guide member 488 are disposed such that magnetism emanating from the rotary magnet 446 passes through from a face on one side of the magnetism detection sensor 484 to a face on the opposite side. The magnetism guided towards the magnetism detection sensor 484 can accordingly be increased even further.

The first magnetism guide member 486 and the second magnetism guide member 488 are also respectively formed in bar shapes with their length directions orientated along the axial direction of the motor section 412, and disposed on the same line as each other. The magnetism emanating from the rotary magnet 446 can accordingly be guided with good efficiency to the magnetism detection sensor 484.

The first magnetism guide members 486 are retained by the placement body 468 that mounts the circuit substrate 416 which mounts the magnetism detection sensors 484. Namely, the first magnetism guide members 486 are retained to the placement body 468 to which the circuit substrate 416 is mounted with good positional precision. The first magnetism guide members 486 can accordingly be disposed with good positional precision with respect to the magnetism detection sensors 484.

The circular cylindrical portion 478, for positioning the shaft portion 480 of the motor section 412, is formed to the placement body 468. The first magnetism guide members 486 can accordingly be disposed with good positional precision with reference to the shaft portion 480 of the motor section 412. It is thus possible to dispose the first magnetism guide member 486 with good positional precision in close to the rotary magnet 446, thereby enabling the magnetism emanating from the rotary magnet 446 to be guided to the magnetism detection sensor 484 with good efficiency.

Note that although the motor 410 according to the sixth exemplary embodiment of the present invention is configured with the second magnetism guide members 488 retained by the cover body 472, configuration may be made such that the second magnetism guide members 488 are retained by another member. For example, configuration may be made with a retaining member provided at the placement body 468 projecting out towards the second magnetism guide member 488, and the second magnetism guide member 488 retained by such a retaining member.

Moreover, although configuration is made with the magnetism detection sensors 484 mounted to the motor section 412 side of the circuit substrate 416, configuration may be with mounting to the opposite side to the motor section 412 side. Moreover, although configuration is made with three individual magnetism detection sensors 484, there may be fewer or more of the individual magnetism detection sensors 484 provided.

Explanation has been given of examples of the present invention, however the present invention is not limited thereto, and it should be understood that various modifications may be implemented thereto within a scope not departing from the spirit of the invention.

What is claimed is:

1. A brushless motor comprising:
    a rotor section that includes a rotor magnet;
    a stator section that generates a rotational magnetic field with respect to the rotor magnet;
    a magnetism guide member that guides a portion of magnetism from the rotor magnet;
    a control unit that includes a circuit substrate and a circuit chamber which is sealed and houses the circuit substrate; and
    a magnetism detection sensor that is mounted on the circuit substrate inside the circuit chamber and that detects magnetism guided by the magnetism guide member, wherein:

an opening portion is formed at a wall portion configuring the circuit chamber;

the magnetism guide member is inserted into the opening portion;

the control unit includes a heat sink;

the wall portion configures the heat sink; and in an axial direction of the rotor section, the wall portion is disposed between the rotor magnet and the circuit substrate.

2. The brushless motor of claim 1, wherein the opening portion is a recessed portion.

3. The brushless motor of claim 1, wherein:

the opening portion is a through hole; and a leading end portion of the magnetism guide member faces and is close to a mounting location of the magnetism detection sensor at the circuit substrate, or faces and is close to the magnetism detection sensor.

4. The brushless motor of claim 3, wherein a seal member is provided between the magnetism guide member and a peripheral portion of the through hole.

5. The brushless motor of claim 3, wherein:

the magnetism detection sensor is mounted on a surface of the circuit substrate which is at a side of the magnetism guide member; and a leading end portion of the magnetism guide member faces and is close to the magnetism detection sensor.

6. The brushless motor of claim 3, wherein the leading end portion of the magnetism guide member projects out further towards a side of the magnetism detection sensor than the through hole.

7. The brushless motor of claim 1, wherein the magnetism guide member is press-fitted into the opening portion.

8. The brushless motor of claim 1, wherein:

the control unit includes a heat sink;

a plurality of mounted components that configure an electrical circuit on the circuit substrate, including the magnetism detection sensor, are mounted on one side surface in a substrate thickness direction of the circuit substrate; and the heat sink is superimposed on another side surface in the substrate thickness direction of the circuit substrate.

9. The brushless motor of claim 1, further comprising a center piece that supports the stator section and the control unit, wherein:

a press-fit hole is formed in the center piece; and the magnetism guide member is press-fitted into the press-fit hole.

10. A motor comprising:

a rotor section that includes a rotor magnet;

a stator section that includes first core teeth sections on each of which a winding wire is wound in a forward winding direction, and each of which configures a forward winding section, and second core teeth sections on each of which a winding wire is wound in a reverse winding direction opposite to the forward winding direction, and each of which configures a reverse winding section, disposed facing the rotor magnet in a radial direction; and a magnetism detection section that detects magnetism generated from the rotor magnet, the magnetism detection section being disposed in a slot formed between one of the first core teeth sections and one of the second core teeth sections, which are adjacent to each other in a circumferential direction of the stator section and which are of the same phase, or being disposed further to a side of the rotor magnet than the slot;

wherein the magnetism detection section includes:

a magnetism detection sensor that is disposed so as to be separated from a motor section configured by the rotor section and the stator section, and that is provided at a circuit section that drives the motor section; and a first magnetism guide member that is disposed between the motor section and the magnetism detection sensor, and that guides the magnetism towards the magnetism detection sensor; and wherein the forward winding sections and the reverse winding sections of a U-phase, a V-phase and a W-phase are provided; and the first magnetism guide member is disposed on a line that bisects an opening angle of the slot.

11. The motor of claim 10, wherein:

the stator section is disposed facing the rotor magnet and is disposed inside of the rotor section in the radial direction;

at each of leading end outer faces of the one of the first core teeth sections and the one of the second core teeth sections which are adjacent to each other in the circumferential direction of the stator section, end portions thereof in a circumferential direction of the stator section are positioned further to an inner side of the stator section in the radial direction of the stator section than a central portion thereof in the circumferential direction of the stator section; and at least a portion of the first magnetism guide member is positioned further to an outer side of the stator section in the radial direction than an imaginary line connecting together an edge portion of the leading end outer face of the one of the first core teeth sections and an edge portion of the leading end outer face of the one of the second core teeth sections, which edge portions are adjacent to each other in the circumferential direction of the stator section.

12. The motor of claim 10, further comprising a second magnetism guide member that is disposed at an opposite side of the magnetism detection sensor from the first magnetism guide member, and that guides the magnetism towards the magnetism detection sensor.

13. A motor comprising:

a motor section that includes a shaft portion and a rotor magnet disposed at an outer side of the shaft portion in a radial direction of the shaft portion;

a magnetism detection sensor that is mounted on a circuit substrate disposed at one side in an axial direction of the shaft portion, and that is disposed so as to be separated from the motor section and that detects magnetism;

a placement body that is disposed between the motor section and the circuit substrate, that places thereon the circuit substrate, and at which a circular cylindrical portion positioning the shaft portion is formed;

a first magnetism guide member that is formed in a bar shape, whose longitudinal direction is along the axial direction of the shaft portion, that is retained at the placement body and disposed between the motor section and the magnetism detection sensor, that is disposed at inner side in the radial direction of the shaft portion with respect to the rotor magnet, and that guides magnetism generated from the rotor magnet towards the magnetism detection sensor, an end portion of the first magnetism guide member, which end portion is at a motor section side, being overlapped with the rotor magnet in the radial direction of the shaft portion; and a second magnetism guide member that is formed in a bar shape, whose longitudinal direction is along the axial direction of the shaft portion, that is disposed at an opposite side of the magnetism detection sensor from the first magnetism guide member such that the first magnetism guide member and the second magnetism guide member are disposed to be along the same straight line, and the magnetism detection sensor is sandwiched between the first magnetism guide member and the second magnetism guide member, and that guides magnetism generated from the rotor magnet towards the magnetism detection sensor.

14. A brushless motor comprising:
a rotor section that includes a rotor magnet;
a stator section that generates a rotational magnetic field with respect to the rotor magnet;
a magnetism guide member that guides a portion of magnetism from the rotor magnet;
a control unit that includes a circuit substrate and a circuit chamber which is sealed and houses the circuit substrate; and
a magnetism detection sensor that is mounted on the circuit substrate inside the circuit chamber and that detects magnetism guided by the magnetism guide member;
wherein
an opening portion is formed at a wall portion configuring the circuit chamber; and
the magnetism guide member is inserted into the opening portion; and further comprising
a center piece that supports the stator section and the control unit, wherein the wall portion is provided at the center piece.

15. A brushless motor comprising:
a rotor section that includes a rotor magnet;
a stator section that generates a rotational magnetic field with respect to the rotor magnet;
a magnetism guide member that guides a portion of magnetism from the rotor magnet;
a control unit that includes a circuit substrate and a circuit chamber which is sealed and houses the circuit substrate; and
a magnetism detection sensor that is mounted on the circuit substrate inside the circuit chamber and that detects magnetism guided by the magnetism guide member,
wherein:
an opening portion is formed at a wall portion configuring the circuit chamber;
the magnetism guide member is inserted into the opening portion;
the opening portion is a recessed portion;
the control unit includes a heat sink and a resin member integrally formed to the heat sink; and
the wall portion is formed at the resin member.

16. A brushless motor comprising:
a rotor section that includes a rotor magnet;
a stator section that generates a rotational magnetic field with respect to the rotor magnet;
a magnetism guide member that guides a portion of magnetism from the rotor magnet;
a control unit that includes a circuit substrate and a circuit chamber which is sealed and houses the circuit substrate; and
a magnetism detection sensor that is mounted on the circuit substrate inside the circuit chamber and that detects magnetism guided by the magnetism guide member;
wherein:
the control unit includes a heat sink and a resin member integrally formed to the heat sink; and
the resin member is integrated to the magnetism guide member by integral molding.

17. A motor comprising:
a rotor section that includes a rotor magnet;
a stator section that includes first core teeth sections on each of which a winding wire is wound in a forward winding direction, and each of which configures a forward winding section, and second core teeth sections on each of which a winding wire is wound in a reverse winding direction opposite to the forward winding direction, and each of which configures a reverse winding section, disposed facing the rotor magnet in a radial direction; and
a magnetism detection section that detects magnetism generated from the rotor magnet, the magnetism detection section being disposed in a slot formed between one of the first core teeth sections and one of the second core teeth sections, which are adjacent to each other in a circumferential direction of the stator section and which are of the same phase, or being disposed further to a side of the rotor magnet than the slot,
wherein
the magnetism detection section includes:
a magnetism detection sensor that is disposed so as to be separated from a motor section configured by the rotor section and the stator section, and that is provided at a circuit section that drives the motor section; and
a first magnetism guide member that is disposed between the motor section and the magnetism detection sensor, and that guides the magnetism towards the magnetism detection sensor;
when viewed in an axial direction of the stator section, at each of leading end outer faces of the one of the first core teeth sections and the one of the second core teeth sections which are adjacent to each other in the circumferential direction of the stator section, end portions of the leading end outer face in the circumferential direction of the stator section are positioned further to an inner side of the stator section in the radial direction of the stator section than a central portion of the leading end outer face in the circumferential direction of the stator section;
when viewed in the axial direction of the stator section, at each of the leading end outer faces of the one of the first core teeth sections and the one of the second core teeth sections which are adjacent to each other in the circumferential direction of the stator section, a portion extending from the central portion to one of the end portions and a portion extending from the central portion to another of the end portions are disposed symmetry in the circumferential direction with respect to the central portion;
when viewed in the axial direction of the stator section, at least a portion of an end portion of the first magnetism guide member is positioned further to an outer side of the stator section in the radial direction than an imaginary line connecting together an edge portion of the leading end outer face of the one of the first core teeth sections and an edge portion of the leading end outer face of the one of the second core teeth sections, which edge portions are adjacent to each other in the circumferential direction of the stator section.

18. The motor of claim 17, further comprising a second magnetism guide member that is disposed at an opposite side of the magnetism detection sensor from the first magnetism guide member, and that guides the magnetism towards the magnetism detection sensor.

* * * * *